(12) United States Patent
Nakatani et al.

(10) Patent No.: US 7,040,087 B2
(45) Date of Patent: May 9, 2006

(54) DEVICE FOR PURIFYING EXHAUST GAS FOR ENGINE

(75) Inventors: Koichiro Nakatani, Mishima (JP); Shinya Hirota, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 75 days.

(21) Appl. No.: 10/607,154

(22) Filed: Jun. 27, 2003

(65) Prior Publication Data

US 2004/0003588 A1    Jan. 8, 2004

(30) Foreign Application Priority Data

Jul. 2, 2002    (JP)    .............................. 2002-193476

(51) Int. Cl.
*F01N 3/00* (2006.01)
(52) U.S. Cl. ............................ 60/286; 60/285; 60/287; 60/295; 60/297; 60/303; 60/296
(58) Field of Classification Search ................. 60/274, 60/285, 286, 288, 295, 296, 297, 303, 311, 60/324; 422/169, 170, 171, 177
See application file for complete search history.

(56) References Cited

U.S. PATENT DOCUMENTS

| 5,473,890 | A | * | 12/1995 | Takeshima et al. | ............ 60/285 |
| 5,850,735 | A | * | 12/1998 | Araki et al. | .................... 60/274 |
| 5,974,791 | A | * | 11/1999 | Hirota et al. | .................. 60/276 |
| 6,119,450 | A | * | 9/2000 | Boegner et al. | .............. 60/274 |
| 6,145,303 | A | * | 11/2000 | Strehlau et al. | ............... 60/274 |
| 6,318,075 | B1 | * | 11/2001 | Gunther et al. | ............... 60/285 |
| 6,408,620 | B1 | * | 6/2002 | Boegner et al. | .............. 60/295 |
| 6,679,050 | B1 | * | 1/2004 | Takahashi et al. | ............ 60/285 |
| 6,758,036 | B1 | * | 7/2004 | Molinier | ...................... 60/286 |
| 2002/0033017 | A1 | * | 3/2002 | Bruggemann et al. | ........ 60/295 |
| 2003/0213235 | A1 | * | 11/2003 | Kitahara et al. | .............. 60/295 |
| 2004/0011028 | A1 | * | 1/2004 | Schnaibel et al. | ............ 60/295 |

FOREIGN PATENT DOCUMENTS

| JP | 53-100314 | 9/1978 |
| JP | B2 2658756 | 6/1997 |
| JP | B2 3216382 | 8/2001 |
| JP | A 2001-342820 | 12/2001 |
| JP | A 2002-13413 | 1/2002 |

* cited by examiner

*Primary Examiner*—Tu M. Nguyen
(74) *Attorney, Agent, or Firm*—Oliff Berridge, PLC

(57) ABSTRACT

A device, for purifying exhaust gas of an engine, comprises a $SO_x$ storage arranged in the exhaust passage for temporarily storing $SO_x$ contained in an exhaust gas inflowing therein, and an auxiliary catalyst arranged in the exhaust passage downstream of the $SO_x$ storage, the auxiliary catalyst having an oxidizing ability. When $SO_x$ stored in the $SO_x$ storage is discharged therefrom with the atmosphere of the auxiliary catalyst being in a sulfate forming atmosphere, the atmosphere of the auxiliary catalyst is changed to an atmosphere other than the sulfate forming atmosphere. When $SO_x$ stored in the $SO_x$ storage is discharged therefrom with the atmosphere of the auxiliary catalyst being in an atmosphere other than the sulfate forming atmosphere, the atmosphere of the auxiliary catalyst is maintained at an atmosphere other than the sulfate forming atmosphere.

32 Claims, 19 Drawing Sheets

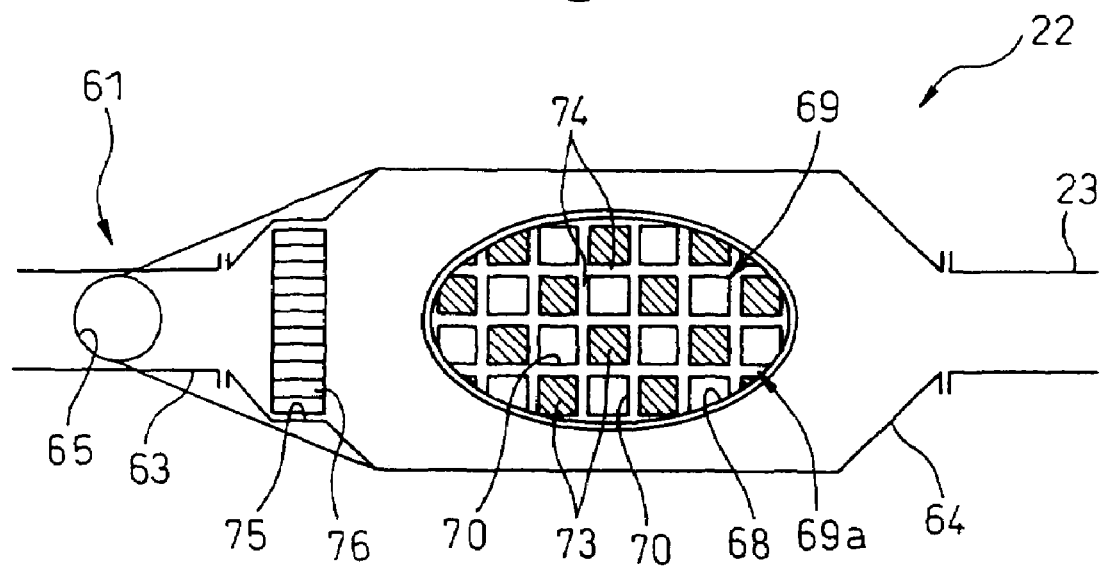
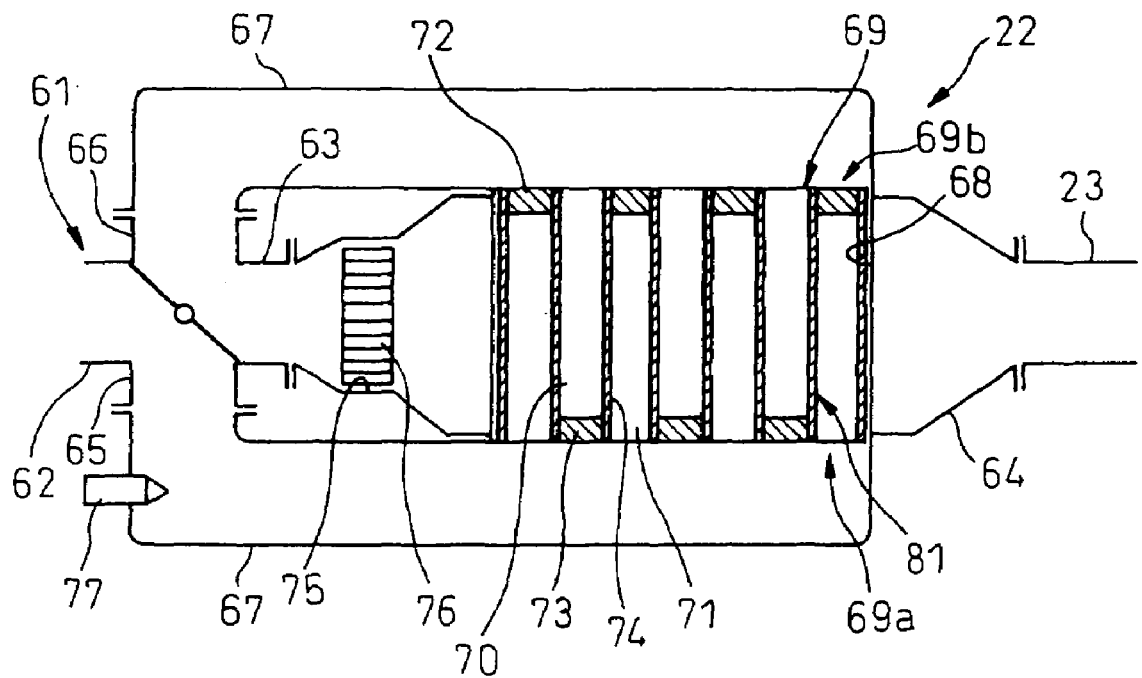

→ FORWARD FLOW
- - -> REVERSE FLOW

DEVICE FOR PURIFYING EXHAUST GAS FOR ENGINE

BACKGROUND OF THE INVENTION

1. Field of the Invention

The present invention relates to a device for purifying exhaust gas for an engine.

2. Related Art

An exhaust gas purification apparatus for an engine which is operated with a lean air-fuel ratio is known. The apparatus comprises a $SO_x$ storage, such as a $NO_x$ catalyst, arranged in an exhaust passage of the engine, for temporarily storing $SO_x$ in the inflowing exhaust gas, a bypass passage connecting the exhaust passages upstream and downstream of the $NO_x$ catalyst to each other while bypassing the $NO_x$ catalyst, a switching valve capable of being turned between a position where substantially all the exhaust gas is introduced into the $NO_x$ catalyst and a bypass position where a small part of the exhaust gas is introduced into the $NO_x$ catalyst while leading the remaining exhaust gas into the bypass passage wherein, when the $SO_x$ stored in the $NO_x$ catalyst should be discharged therefrom, the switching valve is held at the bypass position while the air-fuel ratio of the exhaust gas flowing into the $NO_x$ catalyst is turned to the stoichiometric or rich air-fuel ratio. When the switching valve is held at the bypass position, the amount of the exhaust gas flowing into the $NO_x$ catalyst is reduced, and therefore, the amount of the reducing agent required to make the air-fuel ratio of the exhaust gas flowing into the $NO_x$ catalyst the stoichiometric or rich air-fuel ratio can be reduced. Once the air-fuel ratio of the exhaust gas flowing into the $NO_x$ catalyst is turned to the stoichiometric or rich air-fuel ratio, $SO_x$ stored in the $NO_x$ catalyst is discharged in the form of $SO_2$, $H_2S$ from the $NO_x$ catalyst and the amount of $SO_x$ stored in the $NO_x$ catalyst is thus reduced.

However, when the switching valve is held at the bypass position, a large part of the exhaust gas circumvents the $NO_x$ catalyst, with the result that a large amount of HC and CO may be discharged into the atmosphere.

Although the air-fuel ratio of the exhaust gas flowing into the $NO_x$ catalyst is the stoichiometric or rich air-fuel ratio, the mean air-fuel ratio of the exhaust gas flowing through the exhaust passage downstream of an outlet of the bypass passage is lean. Therefore, it may be considered that an arrangement of an auxiliary catalyst having an oxidation ability in the exhaust passage downstream of the outlet of the bypass passage could solve the above-mentioned problem.

However, if the amount of the reducing agent in the exhaust gas flowing into the auxiliary catalyst is small when the temperature of the auxiliary catalyst is high, another problem may arise that the $SO_2$ and $H_2S$ discharged from the $NO_x$ catalyst are oxidized into the sulfate $SO_3$ at the auxiliary catalyst and the $SO_3$ is discharged into the atmosphere.

SUMMARY OF THE INVENTION

An object of the present invention is to provide a device for purifying exhaust gas for an engine, capable of reducing the amount of sulfate discharged to the outside air.

According to one aspect of the present invention, there is provided a device for purifying exhaust gas for an engine having an exhaust passage, the engine being operated with a lean air-fuel ratio, the device comprising: a $SO_x$ storage arranged in the exhaust passage for temporarily storing $SO_x$ contained in an exhaust gas inflowing therein; an auxiliary catalyst arranged in the exhaust passage downstream of the $SO_x$ storage, the auxiliary catalyst having an oxidizing ability; $SO_x$ discharging means for discharging $SO_x$ stored in the $SO_x$ storage therefrom; and atmosphere control means for controlling an atmosphere of the auxiliary catalyst wherein, when $SO_x$ stored in the $SO_x$ storage is discharged therefrom with the atmosphere of the auxiliary catalyst being in a sulfate forming atmosphere in which an amount of a reducing agent contained in the exhaust gas flowing to the auxiliary catalyst is smaller than an allowable minimum amount and a temperature of the auxiliary catalyst is higher than an allowable maximum temperature, the atmosphere of the auxiliary catalyst is changed to an atmosphere other than the sulfate forming atmosphere, and when $SO_x$ stored in the $SO_x$ storage is discharged therefrom with the atmosphere of the auxiliary catalyst being in an atmosphere other than the sulfate forming atmosphere, the atmosphere of the auxiliary catalyst is maintained at an atmosphere other than the sulfate forming atmosphere.

According to another aspect of the present invention, there is provided a device for purifying exhaust gas for an engine having an exhaust passage, the engine being operated with a lean air-fuel ratio, the device comprising: a $SO_x$ storage arranged in the exhaust passage for temporarily storing $SO_x$ contained in an exhaust gas inflowing therein; an auxiliary catalyst arranged in the exhaust passage downstream of the $SO_x$ storage, the auxiliary catalyst having an oxidizing ability; and $SO_x$ discharging means for discharging $SO_x$ stored in the $SO_x$ storage therefrom, wherein discharge of $SO_x$ stored in the $SO_x$ storage therefrom is prevented or suppressed when the auxiliary catalyst is in, or is turned to, a sulfate forming atmosphere in which an amount of a reducing agent contained in the exhaust gas flowing to the auxiliary catalyst is smaller than an allowable minimum amount and a temperature of the auxiliary catalyst is higher than an allowable maximum temperature.

Note that, in this specification, a ratio of an amount of air to amounts of hydrocarbon HC and carbon monoxide CO, supplied into an exhaust passage, a combustion chamber and an intake passage of the engine, upstream of a certain position in the exhaust passage, are referred to as an air-fuel ratio of the exhaust gas at the above-mentioned position.

The present invention may be more fully understood from the description of the preferred embodiments of the invention as set forth below, together with the accompanying drawings.

BRIEF DESCRIPTION OF THE DRAWINGS

In the drawings:

FIGS. 2A and 2B show a structure of the catalyst converter;

DESCRIPTION OF THE PREFERRED EMBODIMENTS

Figure 1:
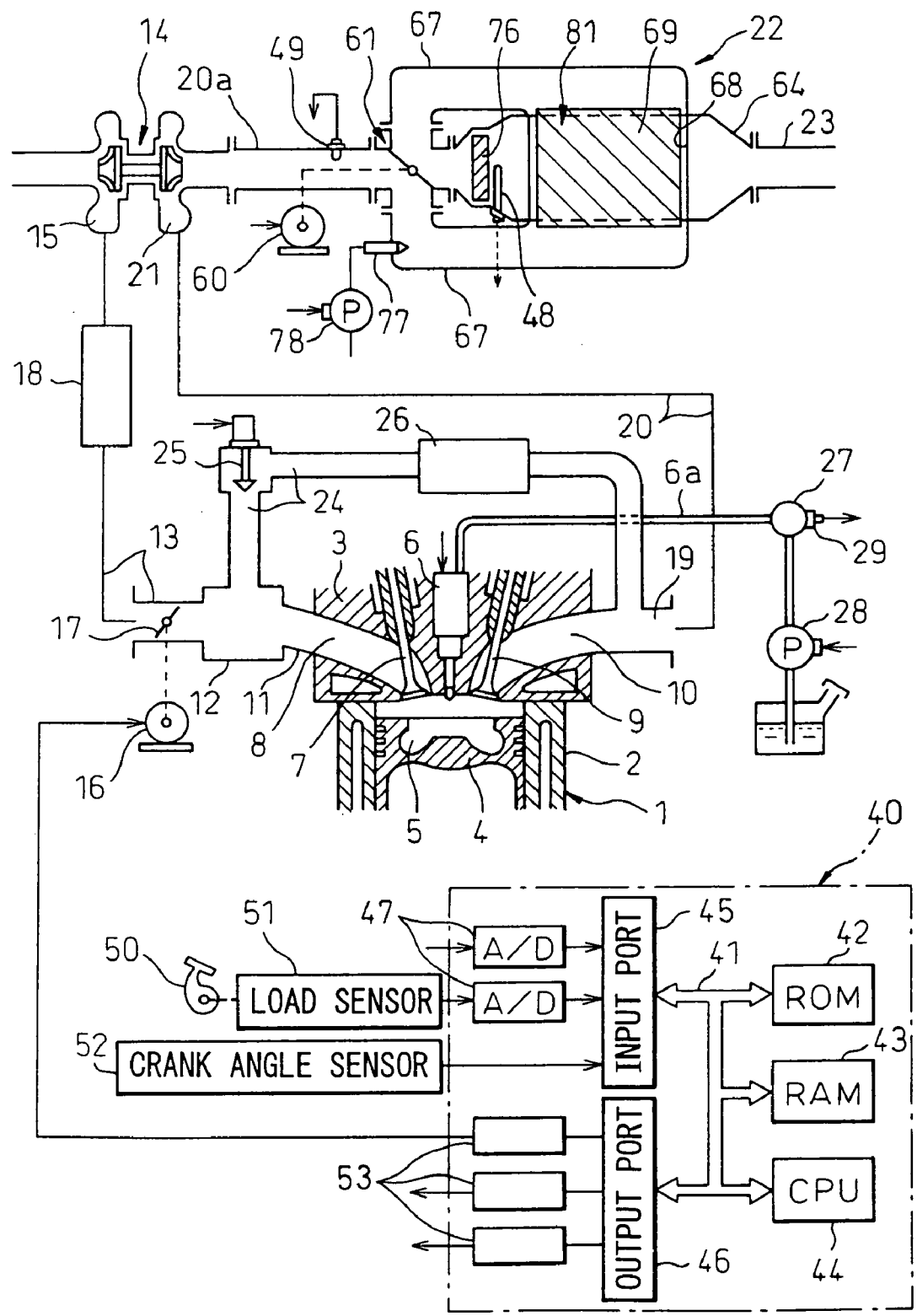
FIG. 1 is an overall view of an internal combustion engine.

FIG. 1 shows a case in which the present invention is applied to an internal combustion engine of compression ignition type. Alternatively, the present invention may be applied to an internal combustion engine of a spark-ignition type.

Referring to FIG. 1, numeral 1 designates an engine body, 2 designates a cylinder block, 3 designates a cylinder head, 4 designates a piston, 5 designates a combustion chamber, 6 designates an electrically-controlled fuel injector, 7 designates intake valves, 8 designates intake ports, 9 designates exhaust valves, and 10 designates exhaust ports. The intake ports 8 are connected to a surge tank through corresponding branch pipes 11, and the surge tank 12 is connected to a compressor 15 of an exhaust turbocharger 14 through an intake duct 13. A throttle valve 17 driven by a step motor 16 is arranged in the intake duct 13. Further, a cooling unit 18 for cooling the intake air flowing in the intake duct 13 is arranged around the intake duct 13. According to the embodiment shown in FIG. 1, the engine cooling water is introduced into the cooling unit 18, and thus the intake air is cooled by the engine cooling water.

On the other hand, the exhaust ports 10 are connected to an exhaust turbine 21 of the exhaust turbocharger 14 through an exhaust manifold 19 and an exhaust pipe 20, and an outlet of the exhaust turbine 21 is connected to a catalyst converter 22 through an exhaust pipe 20a.

Referring to FIGS. 2A and 2B together with FIG. 1, the catalyst converter 22 includes a switching valve 61 driven by a step motor 60, and an outlet of the exhaust pipe 20a is connected to an inlet port 62 of the switching valve 61. Also, an exhaust gas discharge pipe 64 of the catalyst converter 22 is connected to an outlet port 63 of the switching valve 62 in opposed relation with the inlet port 62. The switching valve 61 further includes a pair of inlet/outlet ports 65, 66 in opposed relation to each other on both sides of a straight line connecting the inlet port 62 and the outlet port 63. The inlet/outlet ports 65, 66 are connected to ends of an annular exhaust pipe 67 of the catalyst converter 22. Note that the outlet of the exhaust gas discharge pipe 64 is connected to an exhaust pipe 23.

The annular exhaust pipe 67 penetrates the exhaust gas discharge pipe 64, and a filter chamber 68 is formed in the exhaust gas discharge pipe 64 within the annular exhaust pipe 67. A particulate filter 69 for correcting particles contained in the exhaust gas is accommodated in the filter chamber 68. In FIGS. 2A and 2B, numerals 69a and 69b designate an end surface and the other end surface, respectively, of the particulate filter 69.

As seen from FIG. 2A showing a partial longitudinal sectional view of the catalyst converter 22 including one end surface 69a of the particulate filter 69, and FIG. 2B showing a partial cross sectional view of the catalyst converter 22, the particulate filter 69 has a honeycombed structure and includes a plurality of exhaust gas passages 70, 71 extending in parallel to each other. These exhaust gas passages are comprised of exhaust gas passages 70 with one ends thereof open and the other ends thereof closed with seal members 72, and exhaust gas passages 71 with the other ends thereof open and one ends thereof closed with seal members 73. Note that the hatched parts shown in FIG. 2A indicate the seal members 73. The exhaust gas passages 70, 71 are arranged alternately through thin partitioning walls 74 formed of a porous material such as cordierite. In other words, the exhaust gas passages 70, 71 are arranged in such a manner that each exhaust gas passage 70 is surrounded by four exhaust gas passages 71 and each exhaust gas passage 71 is surrounded by four exhaust gas passages 70.

A $NO_x$ catalyst 81 is carried on the particulate filter 69 as described later. On the other hand, a catalyst chamber 75 is formed in the exhaust gas discharge pipe 64 between the outlet port 63 of the switching valve 61 and a portion where the annular exhaust pipe 67 penetrates. The catalyst chamber 75 accommodates an auxiliary catalyst 76 having an oxidation ability, carried on a substrate having a honeycombed structure.

In addition, a reducing agent injector 77 of an electrically controlled type for supplying a reducing agent to the particulate filter 69 is mounted on the annular exhaust pipe 67 between the inlet/outlet port 65 of the switching valve 61 and the particulate filter 69. The reducing agent injector 77 is supplied with a reducing agent from an electrically controlled reducing agent pump 78. According to embodiments of the present invention, the fuel of the internal combustion engine, i.e. the light oil is used as a reducing agent. Note that, according to the embodiments of the present invention, no reducing agent injector is arranged on the annular exhaust pipe 67 between the inlet/outlet port 66 and the particulate filter 69.

Further referring to FIG. 1, the exhaust manifold 19 and the surge tank 12 are interconnected through an exhaust gas recirculation (hereinafter referred to as EGR) passage 24, and an electrically controlled EGR control valve 25 is arranged in the EGR passage 24. Also, a cooling unit 26 for cooling the EGR gas flowing through the EGR passage 24 is arranged around the EGR passage 24. According to the embodiment shown in FIG. 1, the engine cooling water is introduced into the cooling unit 26, and thus the EGR gas is cooled by the engine cooling water.

On the other hand, each fuel injector 6 is coupled to a fuel reservoir, i.e., so-called a common rail 27, through a fuel supply pipe 6a. This common rail 27 is supplied with fuel from an electrically controlled fuel pump 28 of which a pumping amount is variable. Fuel supplied to the common rail 27 is supplied to the fuel injector 6 through each fuel supply pipe 6a. A fuel pressure sensor 29 for detecting the fuel pressure in the common rail 27 is mounted on the common rail 27. Based on the output signal of the fuel pressure sensor 29, the pumping amount of the fuel pump 28 is controlled to make the fuel pressure in the common rail 27 equal to a target fuel pressure.

An electronic control unit 40 is comprised of a digital computer including a ROM (read-only memory) 42, a RAM (random access memory) 43, a CPU (microprocessor) 44, an input port 45 and an output port 46, which are connected to each other by a bidirectional bus 41. The output signal of the fuel pressure sensor 29 is input to the input port 45 through a corresponding A/D converter 47. A temperature sensor 48 for detecting the temperature of the exhaust gas discharging from the auxiliary catalyst 76 is mounted on the exhaust gas discharge pipe 64 downstream of the auxiliary catalyst 76. The output voltage of the temperature sensor 48 is input to the input port 45 through a corresponding A/D converter 47. The temperature of this exhaust gas represents a temperature of the auxiliary catalyst 76. A pressure sensor 49 for detecting the pressure in the exhaust pipe 20a, i.e. the engine back pressure, is mounted on the exhaust pipe 20a. The output voltage of the pressure sensor 49 is input to the input port 45 through a corresponding A/D converter 47. Also, an acceleration pedal 50 is connected with a load sensor 51 for generating an output voltage proportional to the depression of the acceleration pedal 50. The output voltage of the load sensor 51 is input to the input port 45 through a corresponding A/D converter 47. Further, the input port 45 is connected to a crank angle sensor 52 for generating an output pulse each time the crankshaft rotates by, for example, 30°.

On the other hand, the output port 46 is connected to the fuel injector 6, the step motor 16 for driving the throttle valve 17, the EGR control valve 25, the fuel pump 28, the step motor 60 for driving the switching valve 61, the reducing agent injector 77 and the reducing agent pump 78, through corresponding drive circuits 53.

Figure 3A:
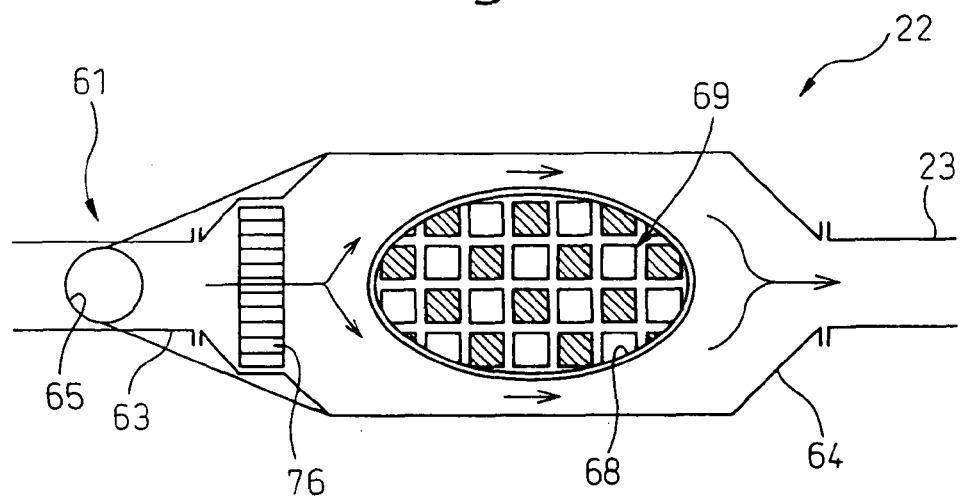
FIGS. 3A and 3B are views for explaining the exhaust gas flow with the switching valve at the forward flow position or the reverse flow position.
Figure 3B:
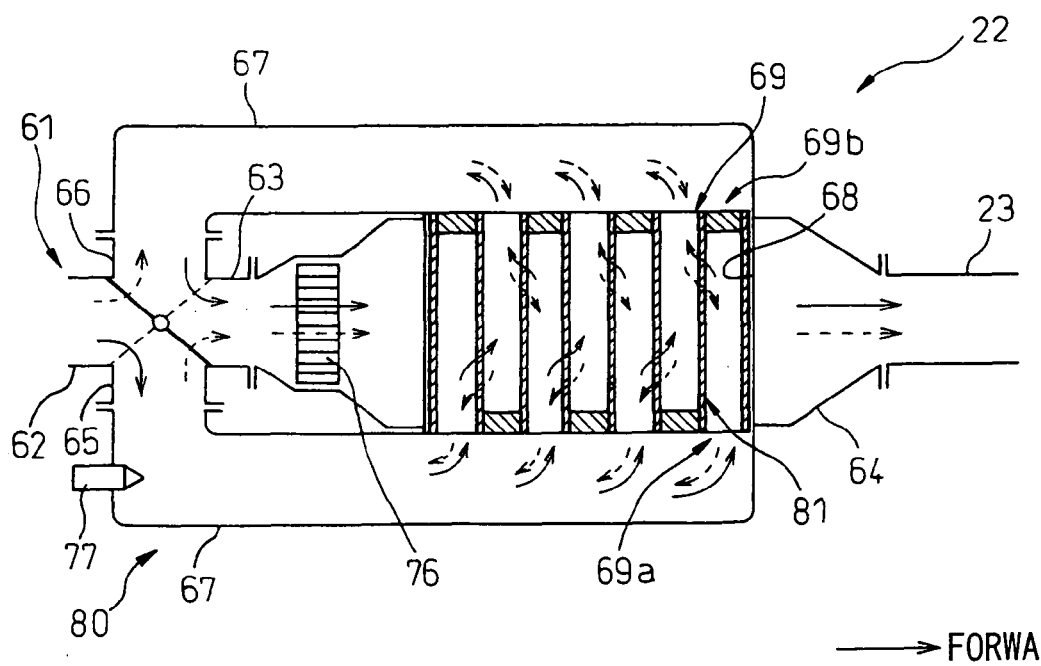

The switching valve 61 is normally located either at a position designated by solid line in FIG. 3B or at a position designated by dashed line. When the switching valve 61 is located at the position indicated by solid line in FIG. 3B, the switching valve 61 communicates the inlet port 62 with the inlet/outlet port 65 while isolating the inlet port 62 from the outlet port 63 and the inlet/outlet port 66, and communicates the outlet port 63 with the inlet/outlet port 66. As a result, as indicated by solid arrow in FIG. 3B, all the exhaust gas flowing through the exhaust pipe 20a flows into the annular exhaust pipe 67 through, in turn, the inlet port 62 and the inlet/outlet port 65, passes through the particulate filter 69, and is discharged into the exhaust gas discharge pipe 64 through, in turn, the inlet/outlet port 66 and the outlet port 63.

Contrarily, when the switching vale 61 is located at the position indicated by the dashed line in FIG. 3B, the switching valve 61 communicates the inlet port 62 with the inlet/outlet port 66 while isolating the inlet port 62 from the outlet port 63 and the inlet/outlet port 65, and communicates the outlet port 63 with the inlet/outlet port 65. As a result, as indicated by the arrow of dashed line in FIG. 3B, all the exhaust gas flowing in the exhaust pipe 20a flows into the annular exhaust pipe 67 sequentially through the inlet port 62 and the inlet/outlet port 66, passes through the particulate filter 69, and is discharged into the exhaust gas discharge pipe 64 sequentially through the inlet/outlet port 65 and the outlet port 63.

In this way, the flow of the exhaust gas in the annular exhaust pipe 67 is reversed by switching the position of the switching valve 61. In other words, the exhaust gas flow can be turned between a state in which the exhaust gas is guided to enter into the $NO_x$ catalyst 81 through one end surface thereof and exits from the $NO_x$ catalyst 81 through the other end surface thereof and a state in which the exhaust gas is guided to enter into the $NO_x$ catalyst 81 through the other end surface thereof and exits from the $NO_x$ catalyst 81 through one end surface thereof. Hereinafter, an exhaust gas flow indicated by solid line in FIG. 3B is referred to as a forward flow, and an exhaust gas flow indicated by dashed line is referred to as a reverse flow. Also, in FIG. 3B, the position of the switching valve 61 indicated by solid line is referred to as a forward flow position, and the position of the switching device 61 indicated by dashed line is referred to as a reverse flow position.

The exhaust gas which is discharged into the exhaust gas discharge pipe 64 through the outflow port 66 passes through the catalyst 76, and proceeds along the outer peripheral surface of the annular exhaust pipe 67, and is discharged into the exhaust pipe 23, as shown in FIGS. 3A and 3B.

The exhaust gas flow in the particulate filter 69 will be explained. In the forward flow mode, the exhaust gas enters into the particulate filter 69 through one end surface 69a, and exits from the particulate filter 69 through the other end surface 69b. In the process, the exhaust gas enters into the exhaust gas passages 70 in the one end surface 69a, and then exits into the adjacent exhaust gas passages 71 through the surrounding partitioning wall 74. In the reverse flow mode, on the other hand, the exhaust gas enters into the particulate filter 69 through the other end surface 69b, and exits from the particulate filter 69 through one end surface 69a. In the process, the exhaust gas enters into the exhaust gas passages 71 in the other end surface 69b, and then exits into the adjacent exhaust gas passages 70 through the surrounding partitioning wall 74.

Figure 4:
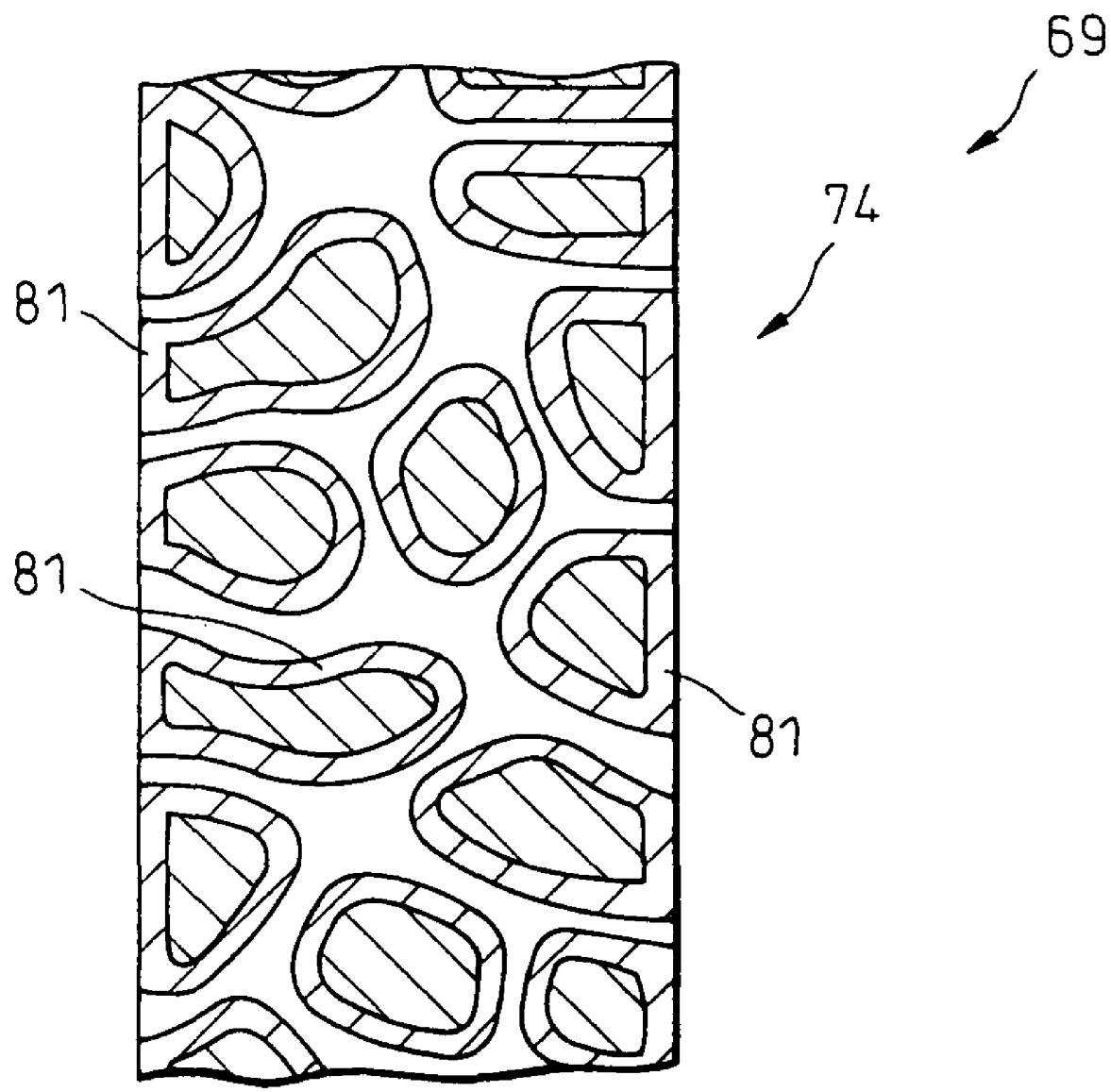
FIG. 4 is a partly enlarged sectional view of a partitioning wall of a particulate filter.

As shown in FIG. 4, the $NO_x$ catalyst 81 is carried on the partitioning wall 74 of the particulate filter 69, i.e., on, for example, both of the side surfaces of the partitioning wall 74 and the inside surfaces of micropores of the partitioning wall 74. The $NO_x$ catalyst 81 includes a substrate comprised of, for example, alumina, on which: at least one selected from an alkali metal such as potassium K, sodium Na, lithium Li or cesium Cs, an alkali earth group such as barium Ba or calcium Ca, and a rare earth group such as lanthanum La or yttrium Y; and a precious metal such as platinum Pt, palladium Pd, rhodium Rh and iridium Ir, are carried.

The $NO_x$ catalyst performs a storage and reduction function in which, when the mean air-fuel ratio of the inflowing exhaust gas is lean, the $NO_x$ catalyst stores $NO_x$ therein and, when the air-fuel ratio of the inflowing gas is decreased while the reducing agent is contained in the inflowing exhaust gas, the $NO_x$ catalyst reduces the stored $NO_x$ to reduce an amount of $NO_x$ stored therein The detailed mechanism of the storage and reduction function of the $NO_x$ catalyst has yet to be completely clarified. However, the mechanism may be briefly explained as follows, with reference to an example in which platinum Pt and barium Ba are carried on the substrate.

Specifically, when the air-fuel ratio of the exhaust gas flowing into the $NO_x$ catalyst becomes considerably lean as compared with the stoichiometric air-fuel ratio, the oxygen concentration in the inflowing exhaust gas greatly increases, and oxygen $O_2$ comes to contact on the surface of platinum Pt in the form of $O_2^-$ or $O^{2-}$. On the other hand, NO in the inflowing exhaust gas is attached on the surface of platinum Pt and reacts with $O_2^-$ or $O^{2-}$ on the surface of platinum Pt into $NO_2$ ($NO+O_2 \rightarrow NO_2+O^*$, where $O^*$ indicates active oxygen). Then, a part of the $NO_x$ thus generated is further oxidized on platinum Pt while, at the same time, being absorbed into the $NO_x$ catalyst and uniting with barium oxide BaO, it is diffused in the $NO_x$ catalyst in the form of nitrate ion $NO_3^-$. In this way, $NO_x$ is stored in the $NO_x$ catalyst.

When the air-fuel ratio of the exhaust gas flowing into the $NO_x$ catalyst becomes rich or equal to the stoichiometric air-fuel ratio, on the other hand, the oxygen concentration of the exhaust gas is reduced and so is an amount of $NO_2$ generated. Thus, the reaction proceeds in the reverse direction ($NO_3^- \rightarrow NO+2O^*$), and the nitrate ions $NO_3^-$ in the $NO_x$ catalyst are released from the $NO_x$ catalyst in the form of NO. When the exhaust gas contains the reducing agent such as HC or CO, the $NO_x$ thus released reacts with the HC or CO and is reduced. Once $NO_x$ disappears from the surface of platinum Pt in this way, $NO_x$ is successively released from the $NO_x$ catalyst, and thus the amount of $NO_x$ stored in the $NO_x$ catalyst is gradually reduced.

Note that $NO_x$ may be stored without forming nitrate and may be reduced without releasing $NO_x$. Also, taking the active oxygen $O^*$ into consideration, the $NO_x$ catalyst can be regarded as an active oxygen generating catalyst which generates active oxygen $O^*$ with the storage and release of $NO_x$.

On the other hand, according to an embodiment of the present invention, the auxiliary catalyst 76 comprises a precious metal catalyst including a precious metal such as platinum Pt without including any alkali metal, alkali earth group or rare earth group. Alternatively, the auxiliary catalyst 76 may comprise the $NO_x$ catalyst as described above.

The particulate filter 69 is arranged substantially at the central part of the annular exhaust pipe 67. Specifically, the distance from the inlet port 62 of the switching valve 61 to the particulate filter 69 and that from the particulate filter 69 to the outlet port 63 substantially remain unchanged regardless of whether the switching valve 61 is located in the forward flow position or the reverse flow position. This indicates that conditions of the particulate filter 69, such as the temperature thereof, remain unchanged regardless of the position of the switching valve 61. Thus, no special control operation is required in accordance with the position of the switching valve 61.

According to the embodiments of the present invention, the switching valve 61 is turned between the forward flow position and the reverse flow position whenever the engine is operated under a light load. This reduces the amount of particulates and $NO_x$ circumventing the particulate filter 69 and the $NO_x$ catalyst 81, as can be understood from the description below.

As described above, regardless of whether the forward flow mode or the reverse flow mode is in process, the exhaust gas passes through the particulate filter 69. Also, the internal combustion engine shown in FIG. 1 continues combustion with a lean air-fuel ratio. Therefore, the air-fuel ratio of the exhaust gas flowing into the particulate filter 69 is maintained lean. As a result, the $NO_x$ contained in the exhaust gas is stored in the $NO_x$ catalyst 81 on the particulate filter 69.

With the lapse of time, the amount of $NO_x$ stored in the $NO_x$ catalyst 81 increases gradually. According to embodiments of the present invention, when, for example, the amount of the $NO_x$ stored in the $NO_x$ catalyst 81 exceeds an allowable amount, a reducing agent is supplied temporarily to the $NO_x$ catalyst 81 from the reducing agent injector 77 in order to reduce $NO_x$ stored in the $NO_x$ catalyst 81 and reduce the amount of the $NO_x$ stored in the $NO_x$ catalyst 81. In this case, the air-fuel ratio of the exhaust gas flowing into the $NO_x$ catalyst 81 is temporarily made rich.

On the other hand, particulates, contained in the exhaust gas and mainly formed of solid carbon, are collected on the particulate filter 69. Briefly speaking, in the forward flow mode, particulates are collected on the side surfaces and in the micropores of the partitioning wall 74 facing to the exhaust gas passage 70 while, in the reverse flow mode, particulates are collected on the side surfaces and in the micropores of the partitioning wall 74 facing to the exhaust gas passage 71. In the internal combustion engine shown in FIG. 1, combustion is continued with a lean air-fuel ratio and the $NO_x$ catalyst 81 has an oxidation ability. Accordingly, particulates on the particulate filter 69 are oxidized and removed, as long as the temperature of the particulate filter 69 is maintained at a temperature not lower than a temperature at which particulates can be oxidized, for example, 250° C.

In this case, according to the $NO_x$ storage and reduction mechanism of the $NO_x$ catalyst 81 described above, active oxygen is generated regardless of whether $NO_x$ is stored in the $NO_x$ catalyst 81 or released therefrom. The active oxygen has a higher activity than oxygen $O_2$ and, therefore, oxidizes particulates deposited on the particulate filter 69 rapidly. In other words, when the $NO_x$ catalyst 81 is carried on the particulate filter 69, particulates deposited on the particulate filter 69 are oxidized regardless of whether the air-fuel ratio of the exhaust gas flowing into the particulate filter 69 is lean or rich. In this way, particulates are continuously oxidized.

However, if the temperature of the particulate filter 69 is not maintained at a temperature in which particulates are oxidized, or if an amount of particulates flowing into the particulate filter 69 per unit time increases considerably, the amount of particulates deposited on the particulate filter 69 gradually increases, which increases pressure loss at the particulate filter 69.

According to embodiments of the present invention, and when, for example, the amount of particulates deposited on the particulate filter 69 exceeds an allowable maximum amount, a particulate oxidation control is performed in which the temperature of the particulate filter 69 is increased to a temperature not lower than a particulate oxidation required temperature TNP such as 600° C., and then maintained at a temperature not lower than the particulate oxidation required temperature TNP, while maintaining the air-fuel ratio of the exhaust gas flowing into the particulate filter 69 lean. When the particulate oxidation control is performed, particulates deposited on the particulate filter 69 are ignited and burnt off, and are thus removed from the particulate filter 69. Note that according to the embodiment shown in FIG. 1, it is judged that the amount of particulates deposited on the particulate filter 69 exceeds the allowable maximum amount when the engine back pressure detected by the pressure sensor 49 exceeds an allowable value with the switching valve 61 being held in the forward flow position or the reverse flow position.

Specifically, according to the embodiment shown in FIG. 1, the reducing agent is supplied from the reducing agent injector 77 in such a manner that the temperature of the particulate filter 69 is increased to a temperature not lower than the particulate oxidation required temperature TNP and then maintained at a temperature not lower than the particulate oxidation required temperature TNP, while maintaining the air-fuel ratio of the exhaust gas flowing into the particulate filter 69 lean, with the switching valve 61 being held in the forward flow position. The reducing agent thus supplied is oxidized on the particulate filter 69, with the result that the temperature TN of the particulate filter 69 is increased and maintained at a temperature not lower than the particulate oxidation required temperature TNP.

Besides the above, the exhaust gas contains sulfur components in the form of $SO_x$, $SO_x$ which are also stored in the $NO_x$ catalyst 81 along with $NO_x$. The mechanism by which $SO_x$ is stored in the $NO_x$ catalyst 81 is considered the same as the mechanism by which $NO_x$ is stored. A brief explanation will be given for a case in which platinum Pt and barium Ba are carried on the substrate. When the air-fuel ratio of the exhaust gas flowing into the $NO_x$ catalyst 81 is lean, oxygen $O_2$ comes into contact with the surface of platinum Pt in the form of $O_2^-$ or $O^{2-}$, as described above. The $SO_2$ in the inflowing exhaust gas attaches to the surface of platinum Pt and reacts with $O_2^-$ or $O^{2-}$ on the surface of platinum Pt into $SO_3$. Then, the $SO_3$ thus generated is further oxidized on the platinum Pt, and absorbed into the $NO_x$ catalyst 81 and united with barium oxide BaO, while being diffused in the $NO_x$ catalyst 81 in the form of sulfur ions $SO_4^-$. The sulfur ions $SO_4^-$ then unite with barium ions $Ba^+$ to generate the sulfate salt $BaSO_4$.

The sulfate salt $BaSO_4$ is hard to decompose, and the amount of the sulfate salt $BaSO_4$ in the $NO_x$ catalyst 81 is not reduced simply by making the air-fuel ratio of the exhaust gas flowing into the $NO_x$ catalyst 81 rich. With the lapse of time, therefore, the amount of the sulfate salt $BaSO_4$ in the $NO_x$ catalyst 81 increases, which reduces an amount of $NO_x$ which can be stored in the $NO_x$ catalyst 81.

However, if the mean air-fuel ratio of the exhaust gas flowing into the $NO_x$ catalyst 81 is made equal to the stoichiometric or rich air-fuel ratio while maintaining the temperature of the $NO_x$ catalyst 81 at a temperature not lower than 550° C., the sulfate salt $BaSO_4$ in the $NO_x$ catalyst 81 is decomposed and released from the $NO_x$ catalyst 81 in the form of $SO_3$. When the exhaust gas contains a reducing agent such as HC or CO, the $SO_3$ thus released reacts with the HC or CO and is reduced to $SO_2$. In this way, the amount of $SO_x$ stored in the form of sulfate salt $BaSO_4$ in the $NO_x$ catalyst 81 is gradually reduced, and $SO_x$ in the form of $SO_3$ are not discharged from the $NO_x$ catalyst 81.

According to the embodiments of the present invention and when, for example, the amount of $SO_x$ stored in the $NO_x$ catalyst 81 exceeds an allowable amount, a stored $SO_x$ amount reduction control is performed in which the temperature of the $NO_x$ catalyst 81 is maintained at a temperature not lower than a $SO_x$ amount reduction required temperature TNS such as 550° C. while maintaining the mean air-fuel ratio of the exhaust gas flowing into the $NO_x$ catalyst 81 at the stoichiometric or rich air-fuel ratio, in order to reduce the amount of $SO_x$ stored in the $NO_x$ catalyst 81.

Specifically, according to the embodiment shown in FIG. 1, the switching valve 61 is turned between the forward flow position and the reverse flow position alternately and repeatedly, and the reducing agent is supplied from the reducing agent injector 77 to maintain the temperature of the $NO_x$ catalyst 81 at a temperature not lower than the $SO_x$ amount reduction required temperature TNS while maintaining the mean air-fuel ratio of the exhaust gas flowing into the $NO_x$ catalyst 81 slight rich, for example.

When the switching valve 61 is turned from the forward flow position to the reverse flow position, for example, the inlet port 62 and the outlet port 63 are temporarily connected directly to each other. Therefore, when the switching valve 61 is turned from the forward flow position to the reverse flow position, the amount of the exhaust gas flowing in forward direction in the $NO_x$ catalyst 81 gradually decreases while the amount of the exhaust gas circumventing the $NO_x$ catalyst 81 gradually increases. Then, after the amount of the exhaust gas flowing in the $NO_x$ catalyst 81 is reduced to zero, the amount of the exhaust gas flowing in the reverse direction in the $NO_x$ catalyst 81 gradually increases while the amount of the exhaust gas circumventing the $NO_x$ catalyst 81 decreases gradually. In this way, turning of the switching valve 61 from the forward flow position to the reverse flow position or in the opposite direction, would temporarily reduce the amount of the exhaust gas flowing through the $NO_x$ catalyst 81 in the forward direction. By supplying the reducing agent from the reducing agent injector 77 in this period, an amount of the reducing agent, required to make the mean air-fuel ratio of the exhaust gas flowing into the $NO_x$ catalyst 81 rich, can be reduced. The reducing agent thus supplied is diffused over the entire $NO_x$ catalyst 81 by the exhaust gas flow in the forward direction. Note that, according to the embodiments of the present invention, the cumulative amount of fuel supplied from the fuel injector 6 and the reducing agent (fuel) supplied from the reducing agent injector 77 is obtained, and when the cumulative amount exceeds a predetermined threshold, it is judged that the amount of $SO_x$ stored in the $NO_x$ catalyst 81 exceeds the allowable amount.

However, if particulates are deposited on the particulate filter 69 when the stored $SO_x$ amount reduction control is performed, a relatively large amount of the reducing agent is supplied to the deposited particulates while the temperature of the deposited particulates is made high. As a result, a so-called abnormal burning of the deposited particulates may occur, which may cause erosion of the particulate filter 69.

According to the $SO_x$ control of the embodiments of the present invention, when the amount of $SO_x$ stored in the $NO_x$ catalyst 81 exceeds the allowable amount, the particulate oxidation control is first performed, and then the stored $SO_x$ amount reduction control is performed. In other words, particulates deposited on the particulate filter 69 are removed therefrom before the stored $SO_x$ amount reduction control is performed.

Figure 5:
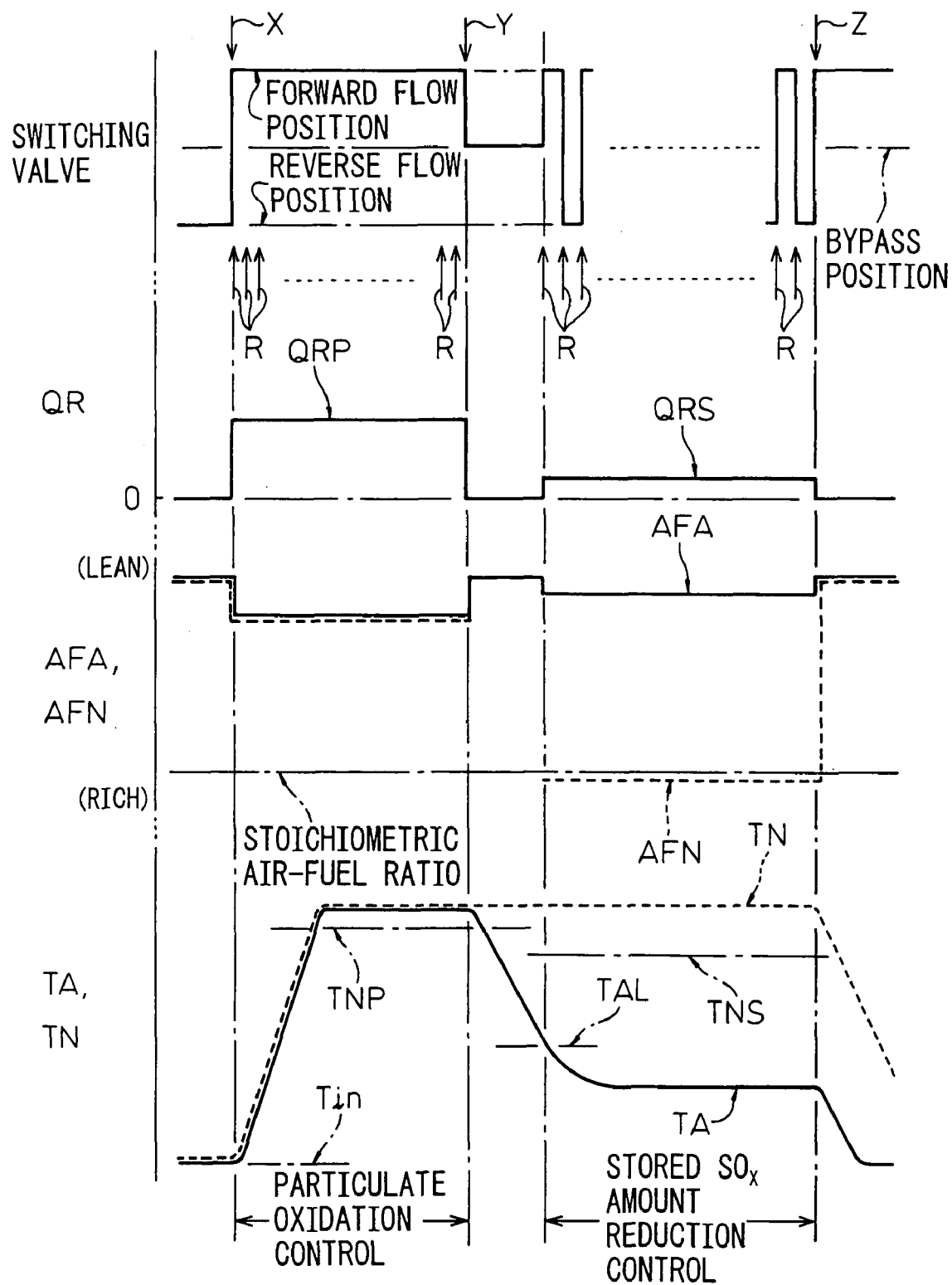
FIG. 5 is a time chart for explaining the first embodiment according to the present invention.

Next, a first embodiment of the present invention will be explained with reference to FIG. 5. In FIG. 5, QR represents the amount of the reducing agent supplied from the reducing agent injector 77, AFA represents a mean air-fuel ratio of the exhaust gas flowing into the auxiliary catalyst 76, AFN represents a mean air-fuel ratio of the exhaust gas flowing into the $NO_x$ catalyst 81 or the particulate filter 69, TA represents the temperature of the auxiliary catalyst 76, TN represents the temperature of the $NO_x$ catalyst 81 or the particulate filter 69, and Tin represents the temperature of the exhaust gas flowing into the $NO_x$ catalyst 81 or the particulate filter 69.

When the stored $SO_x$ amount QS in the $NO_x$ catalyst 81 exceeds an allowable amount QSU as indicated by an arrow X in FIG. 5, the particulate oxidation control is performed first of all. Specifically, the switching valve 61 is turned from the reverse flow position, for example, to the forward flow position and held there, and the reducing agent is intermittently supplied from the reducing agent injector 77 as indicated by arrows R. In the process, the amount QR of the reducing agent supplied from the reducing agent injector 77 is equal to an amount QRP required to maintain the temperature TN of the particulate filter 69 at a temperature not lower than the particulate oxidation required temperature TNP described above with the switching valve 61 being in the forward flow position. As a result, the temperature TN of the particulate filter 69 increases and is maintained at a temperature not lower than the particulate oxidation required temperature TNP. In this case, the temperature TA of the auxiliary catalyst 76 is substantially equal to the temperature TN of the particulate filter 69. Also, as the reducing agent is supplied, the mean air-fuel ratio AFN of the exhaust gas flowing into the $NO_x$ catalyst 81 and the mean air-fuel ratio AFA of the exhaust gas flowing into the auxiliary catalyst 76 are slightly decreased.

Figure 6:
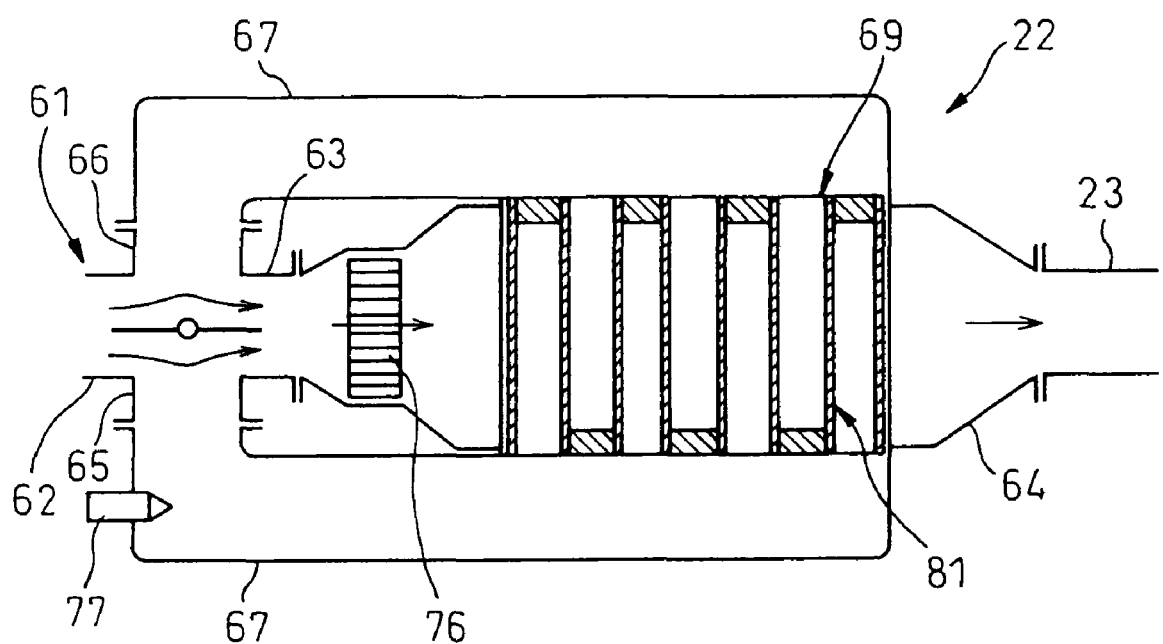
FIG. 6 is a view for explaining the exhaust gas flow with the switching valve at the bypass position.

Next, when the amount of particulates deposited on the particulate filter 69 becomes substantially zero, for example, as indicated by an arrow Y in FIG. 5, the particulate oxidation control is completed. In this case, the switching valve 61 is turned to a bypass position shown in FIG. 6, and the supply of the reducing agent from the reducing agent injector 77 is stopped. When the switching valve 61 is held at the bypass position as shown in FIG. 6, all the exhaust gas flowing through the exhaust pipe 20a flows out into the exhaust gas discharge pipe 64 directly from the inlet port 62 through the outlet port 63. Specifically, the exhaust gas circumvents the $NO_x$ catalyst 81 and the particulate filter 69, and does not flow through the $NO_x$ catalyst 81 and the particulate filter 69. In this way, when the switching valve 61 is held at the bypass position, the exhaust gas passage from the inlet port 62 to the outlet port 63 of the switching valve 61 acts as a bypass passage circumventing the particulate filter 69.

As a result, a large amount of the exhaust gas of the relatively low temperature flows in the auxiliary catalyst 76, and thus the temperature TA of the auxiliary catalyst 76 suddenly drops. In the process, no exhaust gas flows through the $NO_x$ catalyst 81, and the temperature TN of the $NO_x$-catalyst 81 is maintained high.

Next, when the temperature TA of the auxiliary catalyst 76 drops below TAL, the stored $SO_x$ amount reduction control is started. Specifically, the reducing agent is intermittently supplied from the reducing agent injector 77 as indicated by arrows R while the switching valve 61 is alternately and repeatedly turned between the forward flow position and the reverse flow position. In the process, the amount QR of the reducing agent supplied from the reducing agent injector 77 is set equal to QRS required to maintain the temperature TN of the $NO_x$ catalyst 81 at a temperature not lower than the $SO_x$ amount reduction required temperature TNS while maintaining the mean air-fuel ratio of the exhaust gas flowing into the $NO_x$ catalyst 81 slight rich. In this case, a relatively large amount of the exhaust gas circumvents the $NO_x$ catalyst 81, and therefore the mean air-fuel ratio AFA of the exhaust gas flowing into the auxiliary catalyst 76 is kept lean. Also, the temperature of the exhaust gas circumventing the $NO_x$ catalyst 81 is low, and thus the temperature TA of the auxiliary catalyst 76 is maintained low when the stored sox amount reduction control is performed.

Next, when the amount of $SO_x$ stored in the $NO_x$ catalyst 81 becomes substantially zero, for example, as indicated by an arrow Z in FIG. 5, the stored $SO_x$ amount reduction control is completed. In this case, the switching valve 61 is turned to, for example, the forward flow position, and the supply of the reducing agent from the reducing agent injector 77 is stopped.

According to the first embodiment of the present invention as described above, the stored $SO_x$ amount reduction control is not started immediately after completion of the particulate oxidation control, but is started when the temperature TA of the auxiliary catalyst 76 drops below TAL. This is for the following reasons.

$SO_2$, which discharged from the $NO_x$ catalyst 81 by the stored $SO_x$ amount reduction control, flows into the auxiliary catalyst 76. On the other hand, when the stored $SO_x$ amount reduction control is in progress, the mean air-fuel ratio AFA of the exhaust gas flowing into the auxiliary catalyst 76 is maintained lean as described above. Therefore, the amount of the reducing agent such as HC, CO in the exhaust gas flowing into the auxiliary catalyst 76 is relatively small. If $SO_2$ flows into the auxiliary catalyst 76 when the amount of the reducing agent in the exhaust gas flowing into the auxiliary catalyst 76 is small and the temperature TA of the auxiliary catalyst 76 is relatively high, the $SO_2$ is oxidized into sulfate $SO_3$ in the auxiliary catalyst 76, and therefore a large amount of sulfate $SO_3$ may be discharged from the auxiliary catalyst 76.

Figure 7A:
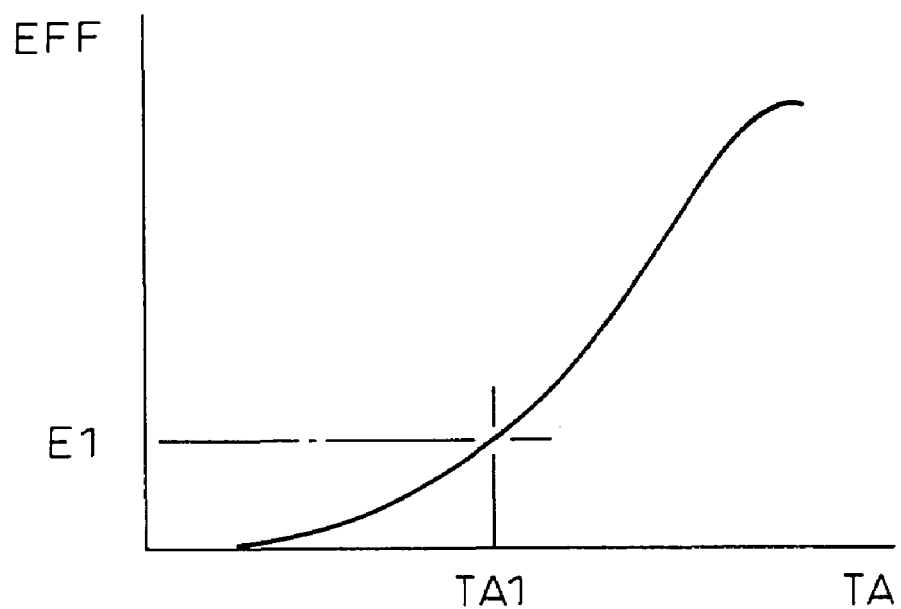
FIGS. 7A and 7B show the sulfate conversion efficiency of the auxiliary catalyst.
Figure 7B:
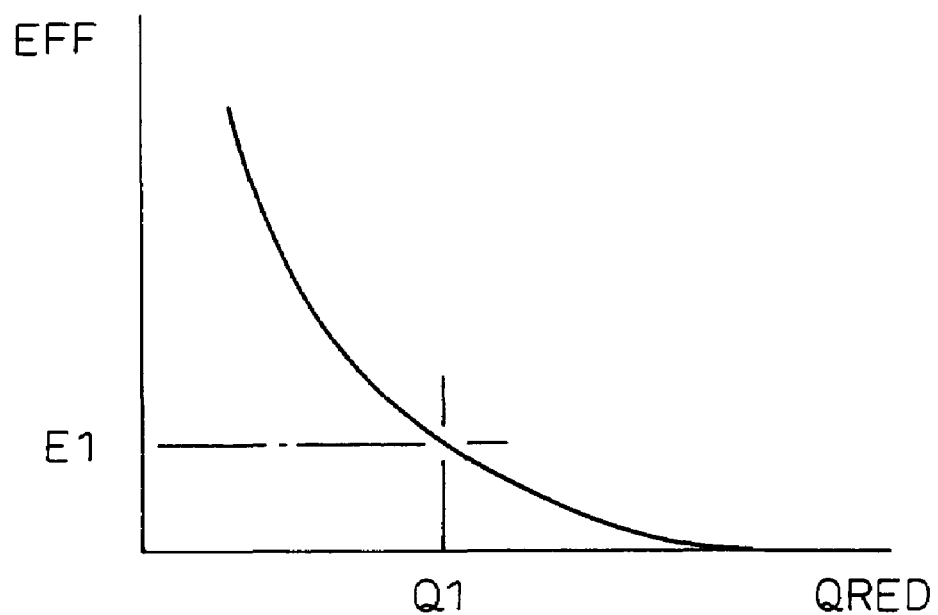

More specifically, an efficiency EFF of the auxiliary catalyst 76 regarding a conversion from $SO_2$ to sulfate $SO_3$ (=(the concentration of sulfate $SO_3$ in the exhaust gas discharged from the auxiliary catalyst 76)/(the concentration of $SO_2$ in the exhaust gas flowing into the auxiliary catalyst 76)), becomes high as the temperature TA of the auxiliary catalyst 76 becomes high, as shown in FIG. 7A, and exceeds an allowable value E1 when the temperature TA of the auxiliary catalyst 76 exceeds an allowable upper limit temperature TA1. Also, as shown in FIG. 7B, the conversion efficiency EFF becomes-high as the amount QRED of the reducing agent in the exhaust gas flowing into the auxiliary catalyst 76 becomes small, and exceeds the allowable value E1 when the amount QRED of the reducing agent becomes smaller than an allowable lower limit amount Q1. In other words, when the auxiliary catalyst 76 is in an atmosphere in which the amount QRED of the reducing agent is smaller than the allowable lower limit amount Q1 and the temperature TA of the auxiliary catalyst 76 is higher than the allowable upper limit temperature TA1, a large amount of sulfate may be discharged from the auxiliary catalyst 76.

Such an atmosphere is referred to as a sulfate forming atmosphere. Accordingly, a large amount of sulfate $SO_3$ may be discharged from the auxiliary catalyst 76 if $SO_x$ flows into the auxiliary catalyst 76 which is in the sulfate forming atmosphere.

Just after completion of the particulate oxidation control, the auxiliary catalyst 76 is in the sulfate forming atmosphere. Therefore, if the stored $SO_x$ reduction control is started just after completion of the particulate oxidation control, the $SO_x$ which is discharged from the $NO_x$ catalyst 81 flows into the auxiliary catalyst 76 and is converted to sulfate $SO_3$.

According to the first embodiment of the present invention, after completion of the particulate oxidation control, the temperature of the auxiliary catalyst 76 is lowered to change the atmosphere of the auxiliary catalyst 76 to an atmosphere other than the sulfate forming atmosphere, and then the stored $SO_x$ amount reduction control is performed. Specifically, the temperature TA of the auxiliary catalyst 76 is lowered to a temperature not higher than TAL corresponding to the allowable upper limit temperature TA1 shown in FIGS. 7A and 7B and, then, the stored $SO_x$ amount reduction control is performed. In this case, the allowable upper limit temperature TAL is about 350 to 400° C., for example.

Alternatively, the atmosphere of the auxiliary catalyst 76 may be changed to an atmosphere other than the sulfate forming atmosphere by increasing the amount of the reducing agent in the exhaust gas flowing into the auxiliary catalyst 76 to an amount not smaller than the allowable minimum amount.

Accordingly, in general, when the $SO_x$ stored in the $NO_x$ catalyst 81 is discharged from the $NO_x$ catalyst 81 with the auxiliary catalyst 76 being in the sulfate forming atmosphere, the atmosphere of the auxiliary catalyst 76 is changed to an atmosphere other than the sulfate forming atmosphere.

Figure 8:
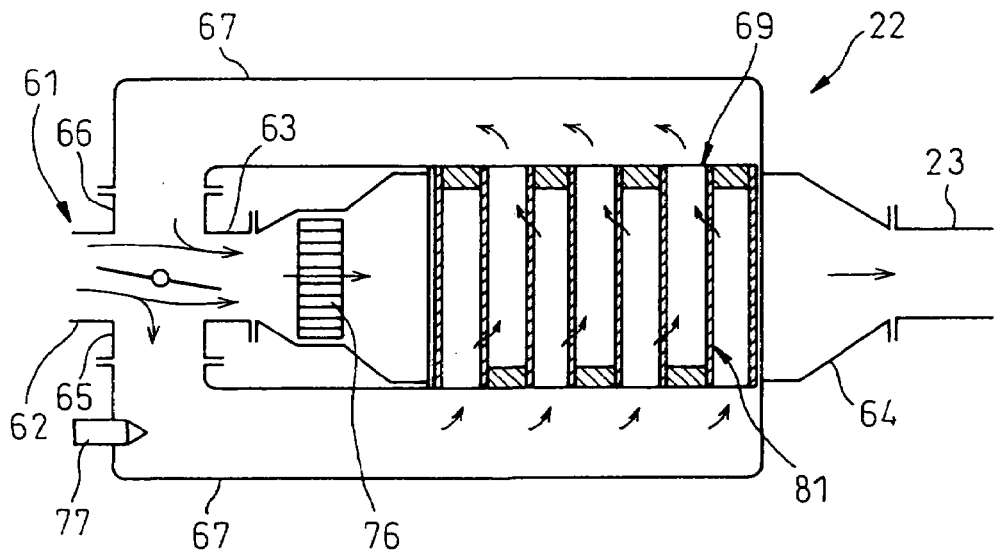
FIG. 8 is a view for explaining the exhaust gas flow with the switching valve at the weakened forward flow position.

According to the first embodiment of the present invention, in order to lower the temperature TA of the auxiliary catalyst 76, the switching valve 61 is temporarily held at the bypass position while stopping the supply of the reducing agent from the reducing agent injector 77. Alternatively, the switching valve 61 may be held temporarily at a weakened forward flow position as shown in FIG. 8, for example, while stopping the supply of the reducing agent from the reducing agent injector 77, to lower the temperature TA of the auxiliary catalyst 76. When the switching valve 61 is held at the weakened forward flow position as indicated by arrows in FIG. 8, a part of the exhaust gas flowing through the exhaust pipe 20a flows into the annular exhaust pipe 67 through the inlet/outlet port 65, and then flows through the $NO_x$ catalyst 81 in the forward flow direction. The remaining exhaust gas directly exits into the exhaust gas discharge pipe 64 from the inlet port 62 through the outlet port 63, i.e., circumvents the $NO_x$ catalyst 81, and then flows into the auxiliary catalyst 76. Further alternatively, the temperature TA of the auxiliary catalyst 76 may be lowered simply by temporarily stopping the supply of the reducing agent from the reducing agent injector 77 while holding the switching valve 61 at, for example, the forward flow position.

In addition, in order to perform the stored $SO_x$ amount reduction control, the reducing agent may be supplied from the reducing agent injector 77 in such a manner that the mean air-fuel ratio of the exhaust gas flowing into the $NO_x$ catalyst 81 is maintained slightly rich while maintaining the temperature of the $NO_x$ catalyst 81 at a temperature not lower than the $SO_x$ amount reduction required temperature TNS, with the switching valve 61 being held at the weakened forward flow position. Also in this case, the amount of the reducing agent required to make the mean air-fuel ratio of the exhaust gas flowing into the $NO_x$ catalyst 81 rich can be reduced.

Further, according to the first embodiment of the present invention, the temperature TA of the auxiliary catalyst 76 is detected, and the stored $SO_x$ amount reduction control is started when the temperature TA of the auxiliary catalyst 76 becomes not higher than the allowable upper limit temperature TAL. Alternatively, a time required for the temperature TA of the auxiliary catalyst 76 to become not higher than the allowable lower limit temperature TAL from the switching valve 61 being held, for example, at the bypass position, may be determined in advance, and the switching valve 61 may be held at the bypass position for the required time after completion of the particulate oxidation control, and then the stored $SO_x$ amount reduction control may be started.

When $SO_x$ stored in the $NO_x$ catalyst 81 is discharged from the $NO_x$ catalyst 81 with the auxiliary catalyst 76 being in an atmosphere other than the sulfate forming atmosphere, the auxiliary catalyst 76 is held in the particular atmosphere, and therefore the atmosphere of the auxiliary catalyst 76 is prevented from becoming a sulfate forming atmosphere.

Figure 9:
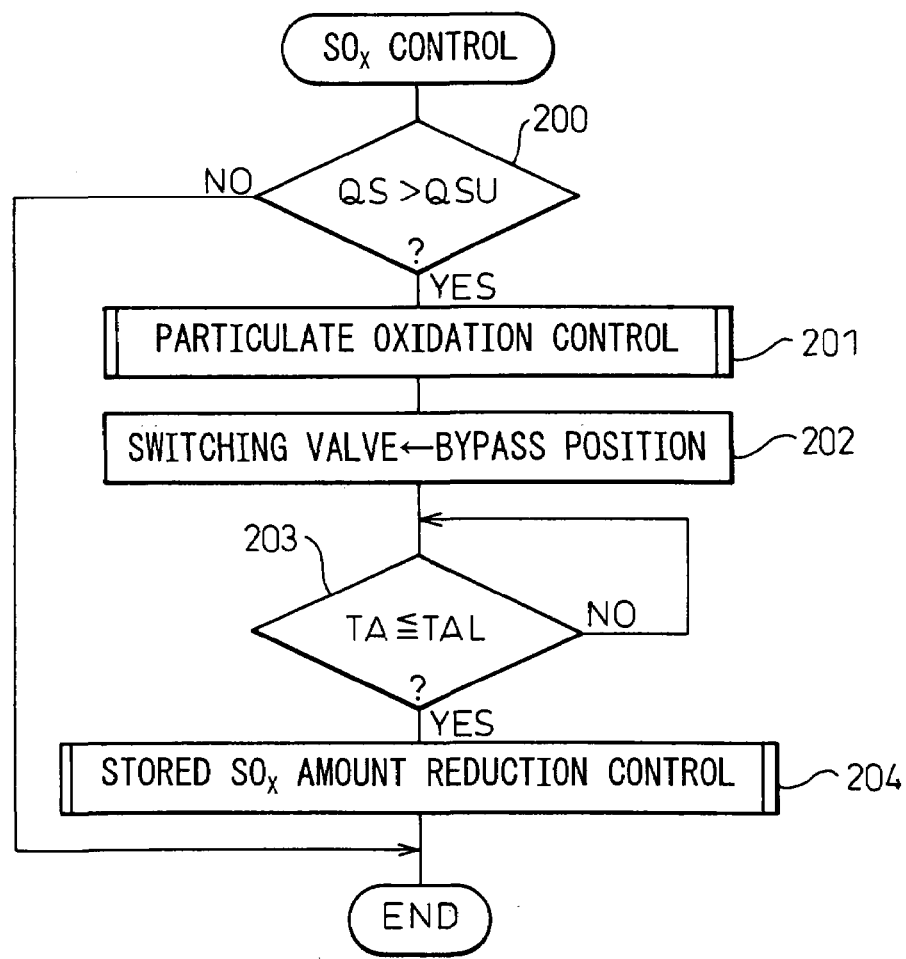
FIG. 9 is a flowchart showing the $SO_x$ control routine of the first embodiment according to the present invention.
Figure 11:
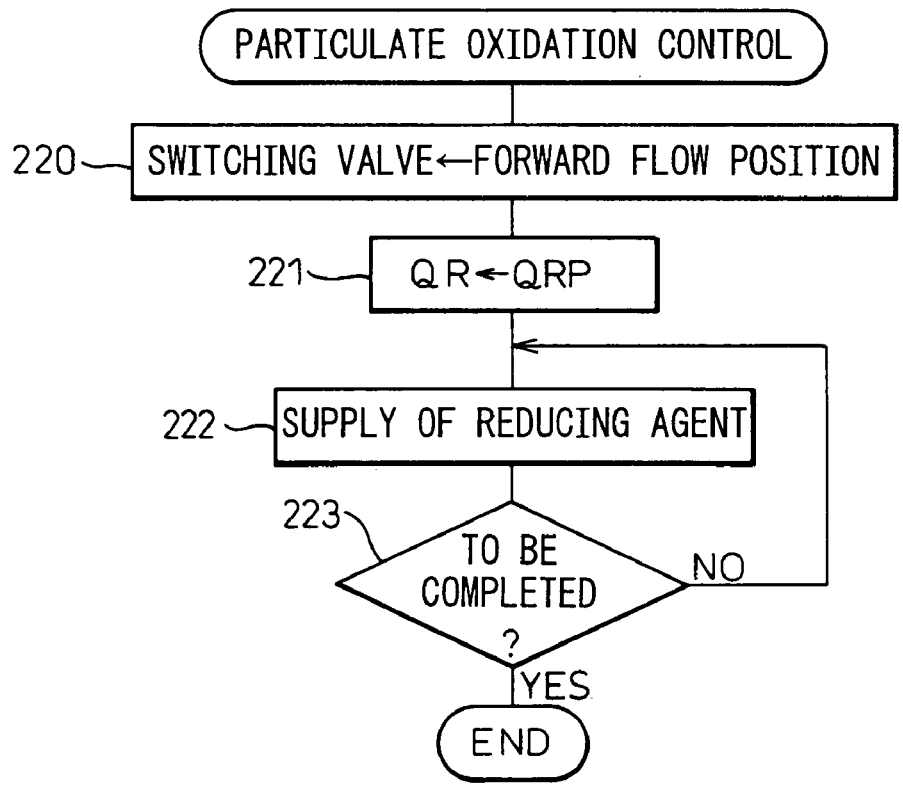
FIG. 11 is a flowchart showing the particulate oxidation control routine of the first embodiment according to the present invention.

FIG. 9 shows the $SO_x$ control routine according to the first embodiment of the present invention. This routine is executed by an interrupt every predetermined time. Referring to FIG. 9, it is judged in step 200 whether the amount QS of $SO_x$ stored in the $NO_x$ catalyst 81 has exceeded the allowable amount QSU. If QS≦QSU, the processing cycle is ended. If QS>QSU, the process proceeds to step 201, where a particulate oxidation control routine, described later with reference to FIG. 11, is executed. In the next step 202, the switching valve 61 is turned to the bypass position. In the next step 203, it is judged whether the temperature TA of the auxiliary catalyst 76 becomes a temperature not higher than the allowable upper limit temperature TAL. As long as TA>TAL, the switching valve 6 is held at the bypass position. When TA≦TAL, the process proceeds to step 204, where a stored $SO_x$ amount reduction control routine, described later with reference to FIG. 12, is executed.

Figure 10:
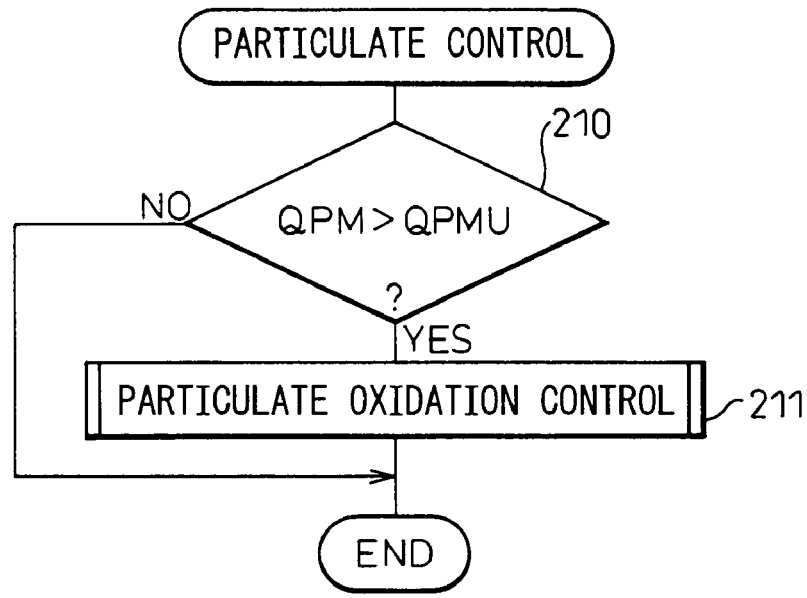
FIG. 10 is a flowchart showing the particulate control routine.

FIG. 10 shows the particulate control routine executed by an interruption every predetermined time. Referring to FIG. 10, it is first judged in step 210 whether the amount QPM of particulates deposited on the particulate filter 69 has exceeded the allowable amount QPMU. If QPM≦QPMU, the processing cycle is ended. If QPM>QPMU, the process proceeds to step 211, where the particulate oxidation control routine, described later with reference to FIG. 11, is executed.

FIG. 11 shows the particulate oxidation control routine described above. Referring to FIG. 11, first in step 220, the switching valve 61 is turned to or held at the forward flow position. In the next step 221, the amount QR of the reducing agent to be supplied is set to QRP described above. In the next step 222, the reducing agent is supplied from the reducing agent injector 77 by QR. In the next step 223, it is judged whether the particulate oxidation control is to be completed. According to the embodiments of the present invention, it is judged that the particulate oxidation control should be completed when the amount of particulates deposited on the particulate filter 69 becomes substantially zero. The process is returned to step 222 to supply the reducing agent repeatedly until it is judged that the particulate oxidation control should be completed. When it is judged that the particulate oxidation control should be completed, the processing cycle is ended.

Figure 12:
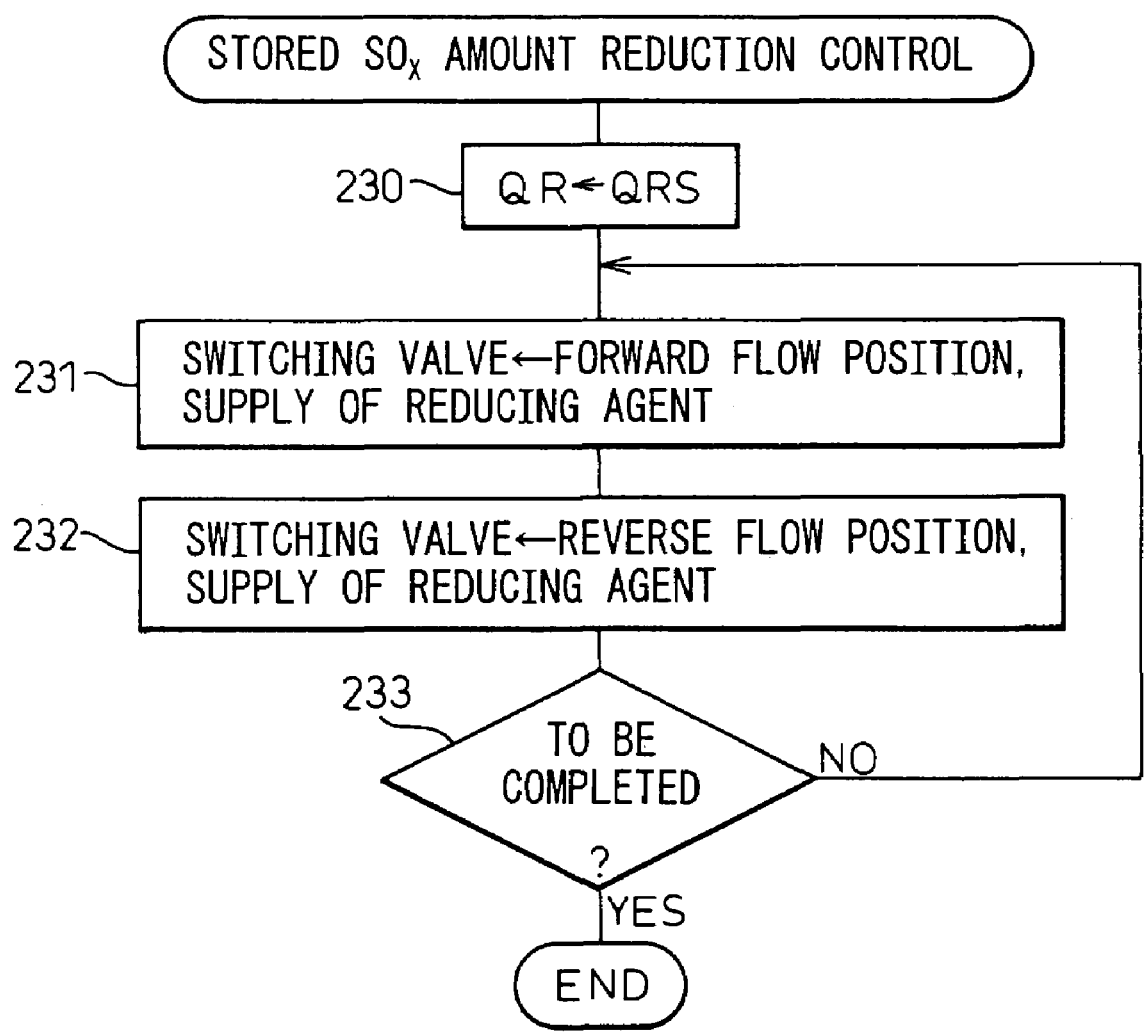
FIG. 12 is a flowchart showing the stored $SO_x$ amount reduction control routine of the first embodiment according to the present invention.

FIG. 12 shows the stored $SO_x$ amount reduction control routine. Referring to FIG. 12, first in step 230, the amount QR of the reducing agent to be supplied is set to QRS described above. In the next step 231, the switching valve 61 is turned to the forward flow position, during which the reducing agent is supplied from the reducing agent injector 77 by QR. In the next step 232, the switching valve 61 is turned to the reverse flow position, during which the reducing agent is supplied from the reducing agent injector 77 by QR. In the next step 233, it is judged whether the stored $SO_x$ amount reduction control is to be completed. According to the embodiments of the present invention, it is judged that the stored $SO_x$ amount reduction control should be completed when the amount of $SO_x$ stored in the $NO_x$ catalyst 81 becomes substantially zero. The process is returned to steps 231 and 232 to supply the reducing agent repeatedly until it is judged that the stored $SO_x$ amount reduction control should be completed. When it is judged that the stored $SO_x$ amount reduction control should be completed, the processing cycle is ended.

Next, a second embodiment of the present invention will be explained with reference to FIGS. 13 and 14. Also in the second embodiment of the present invention, when the stored $SO_x$ amount reduction control should be performed, the particulate oxidation control is in advance of the stored $SO_x$ amount reduction control. Note that, in the second embodiment of the present invention, TAL described above is referred to as a first allowable upper limit temperature.

Figure 13:
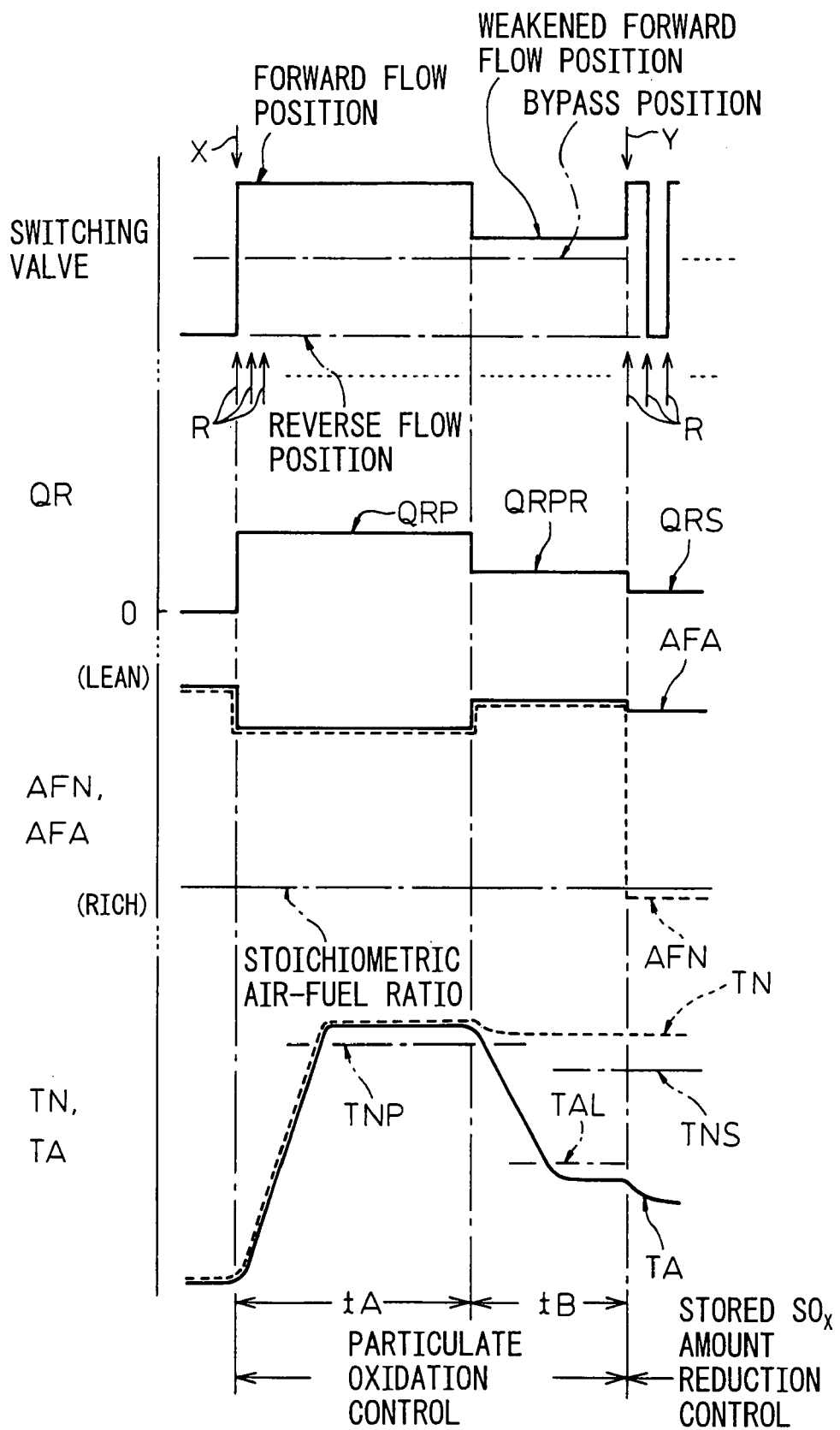
FIGS. 13 and 14 are time charts for explaining a second embodiment according to the present invention.

When the amount QS of $SO_x$ stored in the $NO_x$ catalyst 81 exceeds the allowable amount QSU as indicated by an arrow X in FIG. 13, the particulate oxidation control is performed first of all. Specifically, as in the same manner as the first embodiment, the switching valve 61 is turned from, for example, the reverse flow position to the forward flow position and held thereat, and the reducing agent is supplied intermittently from the reducing agent injector 77 as indicated by arrows R. In the process, the amount QR of the supplied reducing agent is set to QRP described above.

After that, when a predetermined time tA has elapsed from the start of the reducing supply operation with QR=QRP, or when the remaining time before the completion of the particulate oxidation control becomes tB, the switching valve 61 is turned to the weakened forward flow position and the amount QR of the reducing agent to be supplied is set to QRPR. QRPR represents an amount of the reducing agent required to maintain the temperature TN of the particulate filter 69 at a temperature not lower than the particulate oxidation required temperature TNP when the switching valve 61 is held at the weakened forward flow position. Note that it may be judged that the remaining time of the particulate oxidation control becomes equal to tB when the engine back pressure detected by the pressure sensor (FIG. 1) becomes lower than a preset value, for example.

Then, when the particulate oxidation control is completed as indicated by an arrow Y in FIG. 13, the stored $SO_x$ amount reduction control is started immediately.

Specifically, if the switching valve 61 is turned to the weakened forward flow position, the amount of the high-temperature exhaust gas which flows through the particulate filter 69 and then flows into the auxiliary catalyst 76 is reduced, and the amount of the low-temperature exhaust gas which circumvents the particulate filter 69 and then flows into the auxiliary catalyst 76 is increased. As a result, the temperature TA of the auxiliary catalyst 76 is gradually reduced, and becomes lower than the first allowable upper limit temperature TAL when the particulate oxidation control is completed. In other words, the atmosphere of the auxiliary catalyst 76 is changed to an atmosphere other than the sulfate forming atmosphere by the time of completion of the particulate oxidation control. Accordingly, even if the stored $SO_x$ amount reduction control is started immediately after completion of the particulate oxidation control, no large amount of the sulfate $SO_3$ is discharged from the auxiliary catalyst 76.

As described above, according to the second embodiment of the present invention, the temperature TA of the auxiliary catalyst 76 is lowered at the end or in the last half period of the particulate oxidation control process, to change the atmosphere of the auxiliary catalyst 76 to an atmosphere other than the sulfate forming atmosphere. From another point of view, the amount of the exhaust gas circumventing the particulate filter 69 is temporarily increased at the end of the particulate oxidation control process.

When the switching valve 61 is held at the forward flow position, the space velocity of the exhaust gas in the particulate filter 69 is relatively high, and thus the reducing agent entered into the particulate filter 69 is oxidized at the outlet end of the particulate filter 69, rather than around the inlet end thereof. As a result, the temperature around the inlet end of the particulate filter 69 becomes lower than that of the outlet end. In other words, nonuniformity of the temperature of the particulate filter 69 may occur.

Contrarily, according to the second embodiment of the present invention, the switching valve 61 is turned to the bypass position when the particulate oxidation control is in process. Therefore, the space velocity of the exhaust gas in the particulate filter 69 is lowered, and the reducing agent is liable to be oxidized around the inlet end of the particulate filter 69. As a result, the temperature around the inlet end of the particulate filter 69 increases, and thus the temperature of the entire particulate filter 69 can be uniformly increased.

Further, when the amount QR of the reducing agent is reduced from QRP to QRPR, the mean air-fuel ratio AFA of the exhaust gas flowing into the auxiliary catalyst 76 and the mean air-fuel ratio AFN of the exhaust gas flowing into the $NO_x$ catalyst 81 increase, as shown in FIG. 13. In other words, the amounts of the reducing agent flowing into the auxiliary catalyst 76 and the $NO_x$ catalyst 81 are increased in the initial period or the first half period of the particulate oxidation control. This reduces the amount of sulfate $SO_3$ discharged from the auxiliary catalyst 76, due to the following reasons.

Specifically, the inventors of the present application have confirmed that the $SO_x$ concentration in the exhaust gas discharging from the $NO_x$ catalyst 81 temporarily becomes higher than that in the exhaust gas inflowing the $NO_x$ catalyst 81 if the temperature TN of the $NO_x$ catalyst 81 becomes high, even when the mean air-fuel ratio AFN of the exhaust gas flowing into the $NO_x$ catalyst 81 is kept lean. This indicates that $SO_x$ stored in the $NO_x$ catalyst 81 is discharged when the temperature of the $NO_x$ catalyst 81 becomes high, and the $SO_x$ thus discharged is stored without forming sulfate salt $BaSO_4$.

It is not clear how the $SO_x$ is stored in the $NO_x$ catalyst 81, but it is considered to be as follows. Specifically, $SO_2$ contained in the exhaust gas flowing into the $NO_x$ catalyst 81 is first attached on the surface of platinum Pt as described above, and then stored in the form of sulfate salt $BaSO_4$. As the amount of $SO_x$ stored in the form of sulfate salt $BaSO_4$ increases, however, $SO_2$ attached on the surface of platinum Pt is hardly converted to sulfate salt $BaSO_4$, and remains attached on the surface of platinum Pt in the form of $SO_2$. In this way, the $SO_x$ is stored without forming sulfate salt $BaSO_4$.

Accordingly, some of $SO_x$ is stored in the form of sulfate salt $BaSO_4$ in the $NO_x$ catalyst 81 and the other is stored without forming sulfate salt $BaSO_4$. Generally speaking, therefore, the $NO_x$ catalyst 81 functions as a $SO_x$ storage agent for storing $SO_x$ in the inflowing exhaust gas either in the form of a sulfate salt or without forming any sulfate salt.

When the particulate oxidation control starts and thus the temperature TN of the $NO_x$ catalyst 81 increases, $SO_x$ stored without forming the sulfate salt $BaSO_4$ is released from the $NO_x$ catalyst 81 in a short period of time. The $SO_x$ then flows into the auxiliary catalyst 76 relatively high in temperature. If a large amount of the reducing agent flows into the auxiliary catalyst 76 at this time, $SO_x$ is discharged in the form of $SO_2$ and no sulfate $SO_3$ is discharged.

On the other hand, the amount of $SO_x$ stored without forming the sulfate salt $BaSO_4$ and discharged from the $NO_x$ catalyst 81 becomes smaller with the lapse of time from the start of the particulate oxidation control. In view of the fact that a rapid oxidization of particulates deposited on the particulate filter 69 is preferable, the air-fuel ratio AFN of the exhaust gas flowing into the $NO_x$ catalyst 81 or the particulate filter 69 is preferably as lean as possible.

Therefore, according to the second embodiment of the present invention, the amount of the reducing agent flowing into the auxiliary catalyst 76 and the $NO_x$ catalyst 81 when the elapsed time from the start of the particulate oxidation control is shorter is increased with respect to that when the elapsed time is longer.

At the time of the start of the particulate oxidation control, $SO_x$ is attached also to the surface of platinum, for example, of the auxiliary catalyst 76. The $SO_x$ is discharged from the auxiliary catalyst 76 in the form of $SO_2$ if the amount of the reducing agent flowing into the auxiliary catalyst 76 is increased.

According to the second embodiment of the present invention, the amount of the reducing agent flowing into the auxiliary catalyst 76 is increased in the initial period of the particulate oxidation control, as described above, and therefore the $SO_x$ attached to the auxiliary catalyst 76 is discharged in the form of $SO_2$. In addition, the amount of the reducing agent flowing into the $NO_x$ catalyst 81 is also increased at this time, and thus $SO_x$ stored in the $NO_x$ catalyst 81 without forming the sulfate salt $BaSO_4$ is prevented from being discharged in the form of sulfate $SO_3$ from the $NO_x$ catalyst 81.

From this viewpoint, the time tA for maintaining the reducing agent amount QR at QRP is set to a time not shorter than a time required for $SO_x$ stored without forming a sulfate salt in the $NO_x$ catalyst 81 and the auxiliary catalyst 76 to be discharged therefrom. On the other hand, the time tB during which the switching valve 61 is held at the bypass position is set to a time not shorter than a time required for the temperature TA of the auxiliary catalyst 76 to become not higher than the first allowable upper limit temperature TAL.

Note that, according to the second embodiment of the present invention, the switching valve 61 is turned to the weakened forward flow position and the amount of the reducing agent flowing into the auxiliary catalyst 76 and the $NO_x$ catalyst 81 is reduced. Alternatively, the amount of the reducing agent flowing into the auxiliary catalyst 76 and the $NO_x$ catalyst 81 may be gradually reduced with the lapse of time of the particulate oxidation control, while the switching valve 61 is held at the forward flow position.

Upon completion of the particulate oxidation control, the stored $SO_x$ amount reduction control is started immediately, as described above. Specifically, also according to the second embodiment of the present invention, the reducing agent is supplied intermittently from the reducing agent injector 77 while alternately and repeatedly turning the switching valve 61 between the forward flow position and the reverse flow position, as shown in FIGS. 13 and 14. In the process, the mean air-fuel ratio AFN of the exhaust gas flowing into the $NO_x$ catalyst 81 is maintained slight rich, and the temperature TN of the $NO_x$ catalyst 81 is maintained at a temperature not lower than the $SO_x$ amount reduction required temperature TNS. In this case, the low-temperature exhaust gas circumventing the $NO_x$ catalyst 18 flows into the auxiliary catalyst 76 in a large amount, and therefore it could be considered that the temperature TA of the auxiliary catalyst 76 does not become too high.

Figure 14:
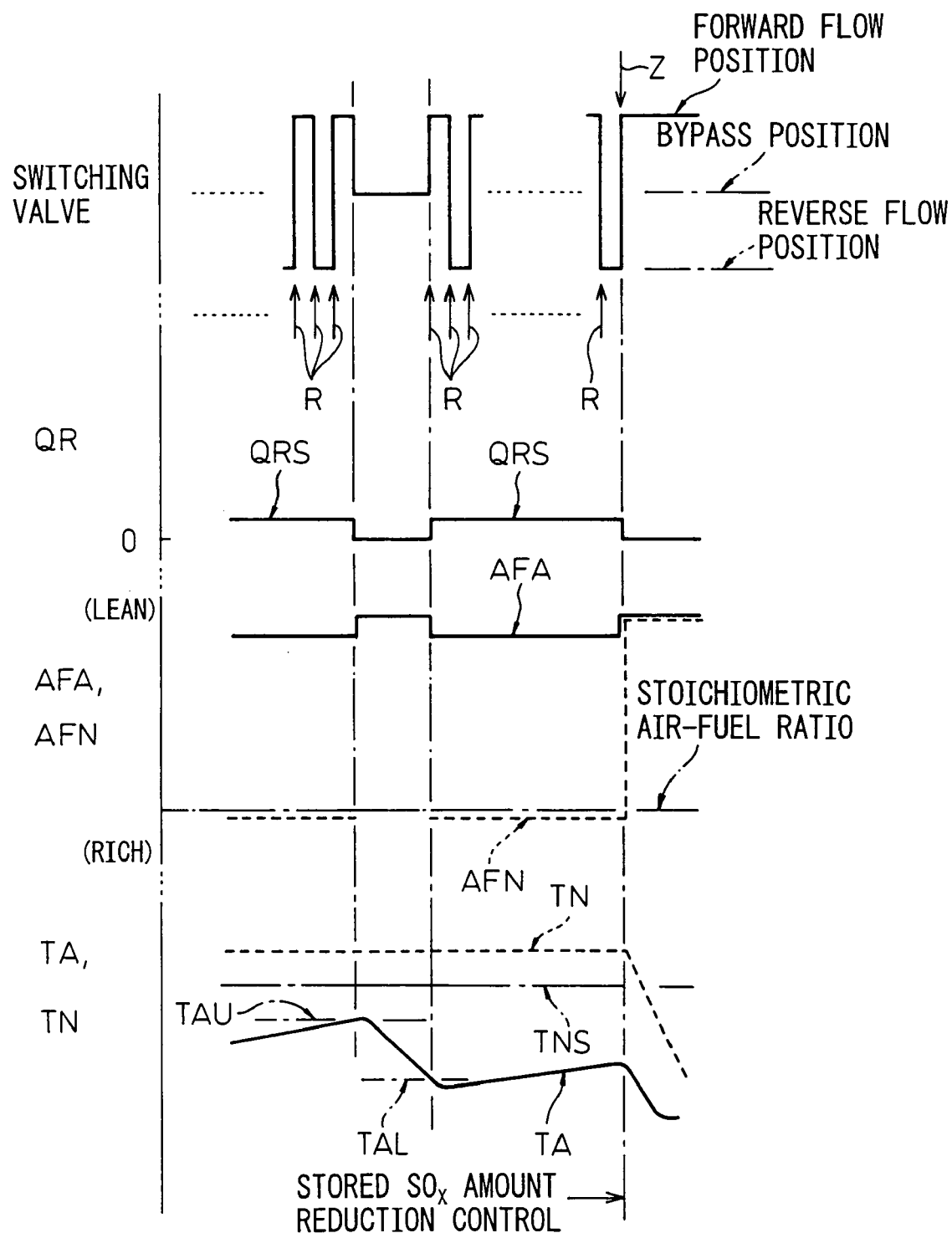

However, when, for example, the amount of the reducing agent which is not oxidized in the $NO_x$ catalyst 81 but is oxidized in the auxiliary catalyst 76 becomes larger, the temperature TA of the auxiliary catalyst 76 increases as shown in FIG. 14, and may exceed a second allowable upper limit temperature TAU which corresponds to the allowable upper limit temperature TA1 explained with reference to FIGS. 7A and 7B. If $SO_x$ is discharged from the $NO_x$ catalyst 81 at this time, a large amount of the sulfate $SO_3$ is discharged from the auxiliary catalyst 76.

Therefore, according to the second embodiment of the present invention, if the temperature TA of the auxiliary catalyst 76 exceeds the second allowable upper limit temperature TAU during the storage $SO_x$ amount reduction control, the stored $SO_x$ amount reduction control is temporarily stopped. Specifically, the supply of the reducing agent from the reducing agent injector 77 is stopped. In addition, the switching valve 61 is turned to the bypass position to lower the temperature TA of the auxiliary catalyst 76. In this way, the temperature of the auxiliary catalyst 76 is lowered while maintaining the temperature TN of the $NO_x$ catalyst 81 at a high temperature.

Then, when the temperature TA of the auxiliary catalyst 76 becomes not higher than the first allowable upper limit temperature TAL, the stored $SO_x$ amount reduction control is resumed. Next, when the amount of $SO_x$ stored in the $NO_x$ catalyst 81 becomes substantially zero as indicated by an arrow Z in FIG. 14, the stored $SO_x$ amount reduction control is completed.

In this way, according to the second embodiment of the present invention, if the atmosphere of the auxiliary catalyst 76 changes to the sulfate forming atmosphere during the stored $SO_x$ amount reduction control, the stored $SO_x$ amount reduction control is stopped. Contrarily, according to the first embodiment of the present invention described above, the auxiliary catalyst 76 is in the sulfate forming atmosphere when the particulate oxidation control is completed and thus the stored $SO_x$ amount reduction control is not started at this time.

Generally speaking, therefore, when the atmosphere of the auxiliary catalyst 76 is, or is turned to, the sulfate forming atmosphere, the $SO_x$ stored in the $NO_x$ catalyst 81 is prevented from being discharged from the $NO_x$ catalyst 81.

Alternatively, when the atmosphere of the auxiliary catalyst 76 is, or is turned to, the sulfate forming atmosphere, the amount of the $SO_x$ discharged from the $NO_x$ catalyst 81 may be suppressed. Suppression of the amount of $SO_2$ flowing into the auxiliary catalyst 76 will reduce the amount of sulfate $SO_3$ discharged from the auxiliary catalyst 76. In this case, the mean air-fuel ratio AFN of the exhaust gas flowing into the $NO_x$ catalyst 81 may be made larger, for example, to suppress the amount of $SO_x$ discharged from the $NO_x$ catalyst 81.

As can be understood from FIGS. 13 and 14, according to the second embodiment of the present invention, it is judged, based on the first allowable upper limit temperature TAL, whether the atmosphere of the auxiliary catalyst 76 is changed from the sulfate forming atmosphere to an atmosphere other than the sulfate forming atmosphere, and is judged based on the second allowable upper limit temperature TAU whether the atmosphere of the auxiliary catalyst 76 is changed from an atmosphere other than the sulfate forming atmosphere to the sulfate forming atmosphere. Note that the second allowable upper limit temperature TAU is about 500° C., for example.

Figure 15:
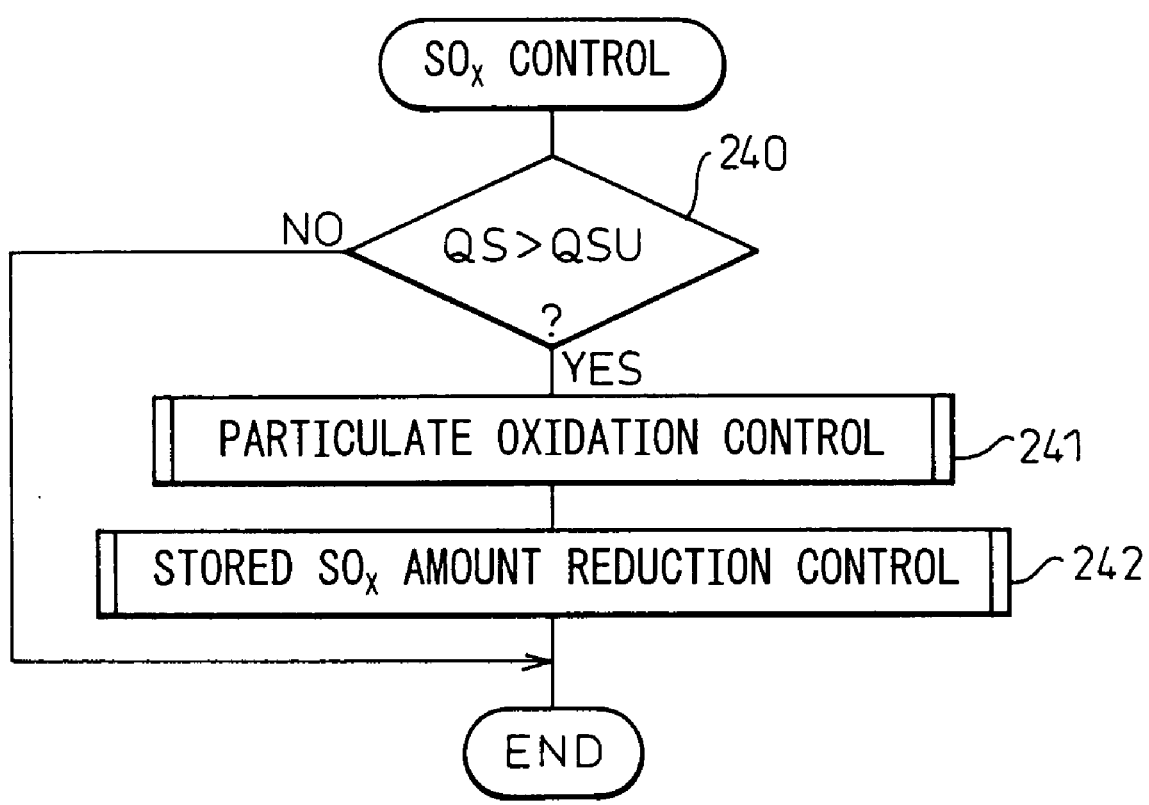
FIG. 15 is a flowchart showing the $SO_x$ control routine of the second embodiment according to the present invention.
Figure 16:
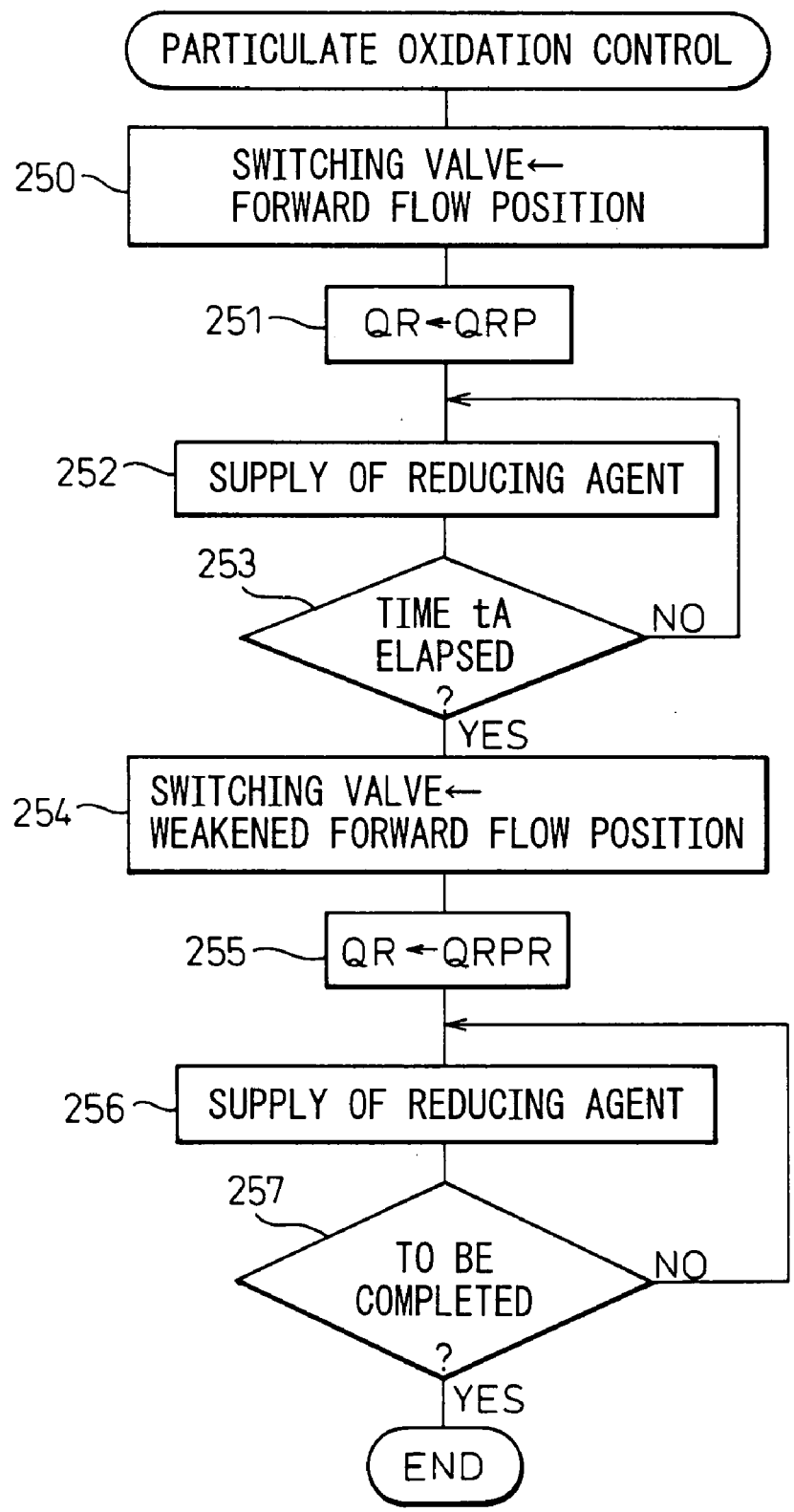
FIG. 16 is a flowchart showing the particulate oxidation control routine of the second embodiment according to the present invention.
Figure 17:
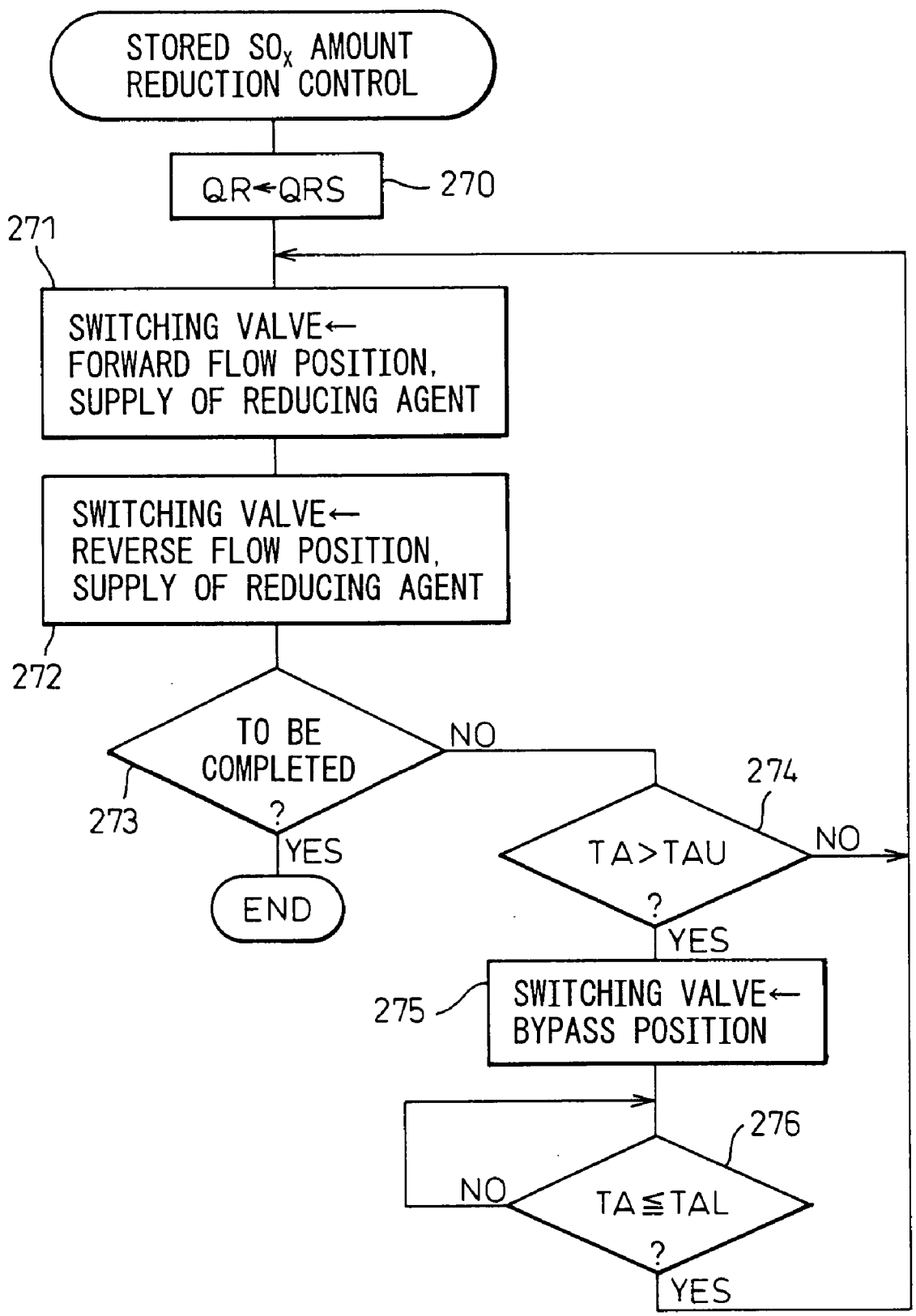
FIG. 17 is a flowchart showing the stored $SO_x$ amount reduction control routine of the second embodiment according to the present invention.

FIG. 15 shows a $SO_x$ control routine according to the second embodiment described above. This routine is executed by an interruption every predetermined time. Referring to FIG. 15, it is judged first in step 240 whether the amount QS of $SO_x$ stored in the $NO_x$ catalyst 81 exceeds the allowable amount QSU. If QS≦QSU, the processing cycle is ended. If QS>QSU, the process proceeds to step 241, where the particulate oxidation control routine, described later with reference to FIG. 16, is executed. In the next step 242, the stored $SO_x$ amount reduction control routine, described later with reference to FIG. 17, is executed. In this way, the stored $SO_x$ amount reduction control routine is started following the particulate oxidation control routine.

FIG. 16 shows the particulate oxidation control routine described above. Referring to FIG. 16, in step 250, the switching valve 61 is turned to or held at the forward flow position. In the next step 251, the reducing agent supply amount QR is set to QRP described above. In the next step 252, the reducing agent is supplied by the amount QR from the reducing agent injector 77. In the next step 253, it is judged whether the set time tA has elapsed from the start of the particulate oxidation control with QR=QRP. Until the lapse of the set time tA, the process is returned to step 252 to supply the reducing agent repeatedly. Upon the lapse of time tA, the process proceeds to step 254, where the switching valve 61 is turned to the weakened forward flow position. In the next step 255, the reducing agent supply amount QP is set to QRPR described above. In the next step 256, the reducing agent is supplied from the reducing agent injector 77 by the amount QR. In the next step 257, it is judged whether the particulate oxidation control is to be completed. Until it is judged that the particulate oxidation control is to be completed, the process is returned to step 256 to supply the reducing agent repeatedly. When it is judged that the particulate oxidation control is to be completed, the processing cycle is ended.

FIG. 17 shows the stored $SO_x$ amount reduction control routine. Referring to FIG. 17, first in step 270, the reducing agent amount QR is set to QRS described above. In the next step 271, the switching valve 61 is turned to the forward flow position during which the reducing agent is supplied by the amount QR from the reducing agent injector 77. In the next step 272, the switching valve 61 is turned to the reverse flow position during which the reducing agent is supplied by the amount QR from the reducing agent injector 77. In the next step 273, it is judged whether the stored $SO_x$ amount reduction control is to be completed. When it is judged that the stored $SO_x$ amount reduction control is not to be completed, the process proceeds to step 274, where it is judged whether the temperature TA of the catalyst 76 is higher than the second allowable upper limit temperature TAU. If TA>TAU, the process proceeds to the next step 275, where the switching valve 61 is turned to the bypass position. In the next step 276, it is judged whether the temperature TA of the auxiliary catalyst 76 is not higher than the first allowable upper limit temperature TAL. Until a condition of TA≦TAL is established, the process of step 276 is repeated. When the condition TA≦TAL is established, the process is returned to step 271. Specifically, until it is judged that the stored $SO_x$ amount reduction control is to be completed, the process is returned to steps 271 and 272 to supply the reducing agent repeatedly.

As described above, $SO_x$ is stored without forming sulfate salt also in the auxiliary catalyst 76, and $SO_x$ thus stored is discharged from the auxiliary catalyst 76 in the form of sulfate $SO_3$ if the temperature TA of the auxiliary catalyst 76 becomes higher with the amount of the reducing agent contained in the exhaust gas flowing into the auxiliary catalyst 76 being small.

On the other hand, if the amount of the reducing agent contained in the exhaust gas flowing into the auxiliary catalyst 76 becomes larger, the $SO_x$ stored in the auxiliary catalyst 76 without forming sulfate salt is discharged from the auxiliary catalyst 76 in the form of $SO_2$.

Therefore, according to an embodiment of the present invention, if the temperature TA of the auxiliary catalyst 76 exceeds the second allowable upper limit temperature TAU during the normal operation mode where neither the particulate oxidation control nor the stored $SO_x$ amount reduction control is performed, the reducing agent is temporarily supplied from the reducing agent injector 77, to temporarily increase the amount of the reducing agent contained in the exhaust gas flowing into the auxiliary catalyst 76. As a result, the $SO_x$ stored in the auxiliary catalyst 76 is removed from the auxiliary catalyst 76 in the form of $SO_2$.

In this case, the reducing agent may be supplied while holding the switching valve 61 either in the forward flow position or in the reverse flow position. However, if the switching valve 61 is held in the forward flow position, the reducing agent supplied flows into the $NO_x$ catalyst 81 and is oxidized in the $NO_x$ catalyst 81, which increases the temperature TN of the $NO_x$ catalyst 81. Consequently, the temperature TN of the $NO_x$ catalyst 81 may exceed an allowable upper limit temperature regarding heat deterioration of the $NO_x$ catalyst 81.

Figure 18:
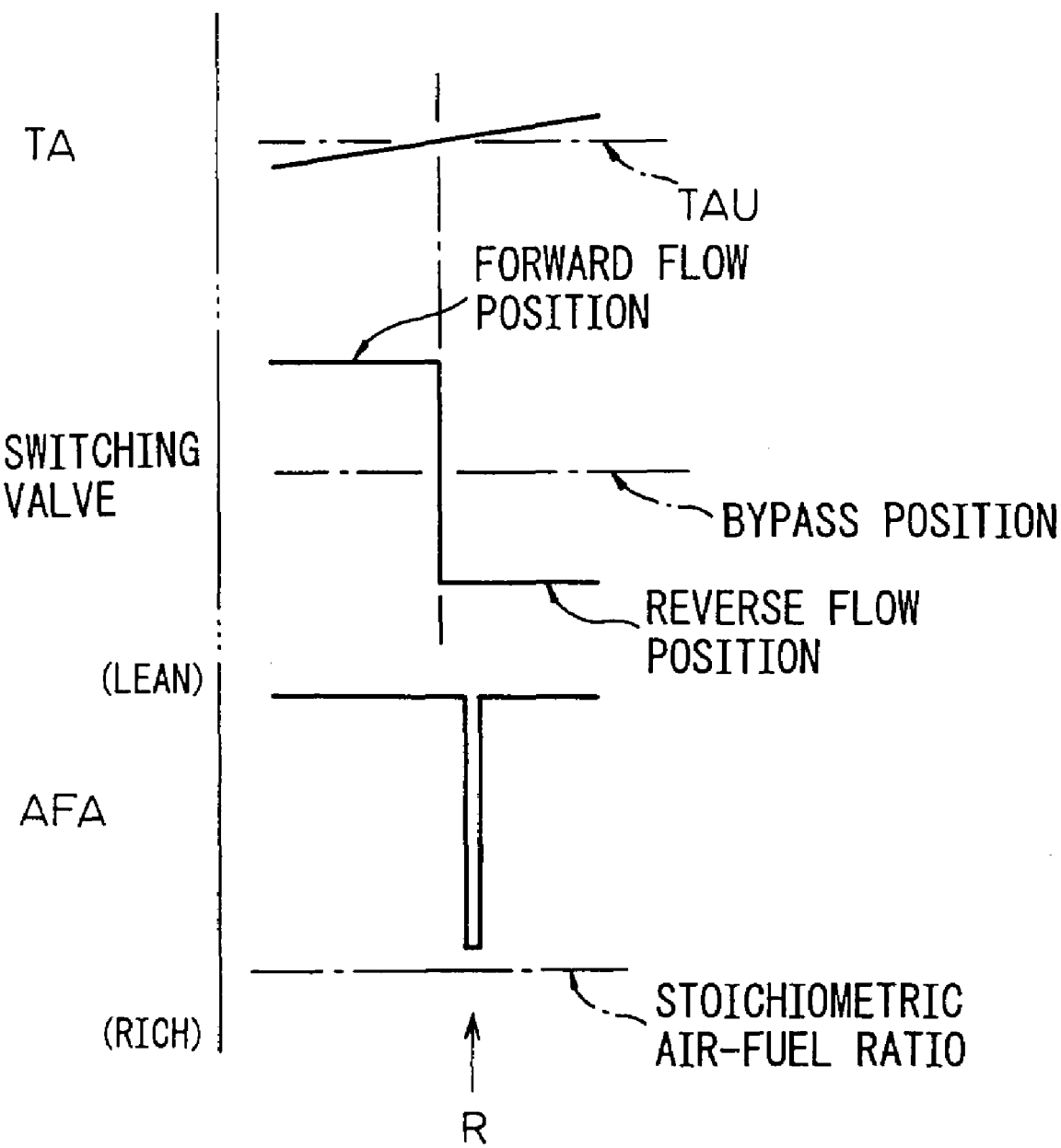
FIG. 18 is a time chart for explaining the $SO_x$ removal control.

Therefore, according to the embodiments of the present invention, if the temperature TA of the auxiliary catalyst 76 exceeds the second allowable upper limit temperature TAU described above, a $SO_x$ removal control in which the reducing agent is temporarily supplied from the reducing agent injector 77 while the switching valve 61 is turned to or held at the reverse flow position, is performed. Specifically, as shown in FIG. 18, when TA becomes higher than TAU, the switching valve 61 is turned from the forward flow position to the reverse flow position, for example, and the reducing agent is supplied from the reducing agent injector 77, as indicated by an arrow R. Under this condition, in an example shown in FIG. 18, the mean air-fuel ratio AFA of the exhaust gas flowing into the auxiliary catalyst 76 is made slightly lean. Instead, the mean air-fuel ratio AFA may be made equal to the stoichiometric air-fuel ratio or slightly rich.

However, just after completion of the $SO_x$ removal control, the particulate oxidation control, or the stored $SO_x$ amount reduction control, the amount of $SO_x$ stored in the auxiliary catalyst 76 is small. Therefore, the $SO_x$ removal control is not performed until a predetermined time tC has elapsed from completion of the $SO_x$ removal control, the particulate oxidation control, or the stored $SO_x$ amount reduction control.

Figure 19:
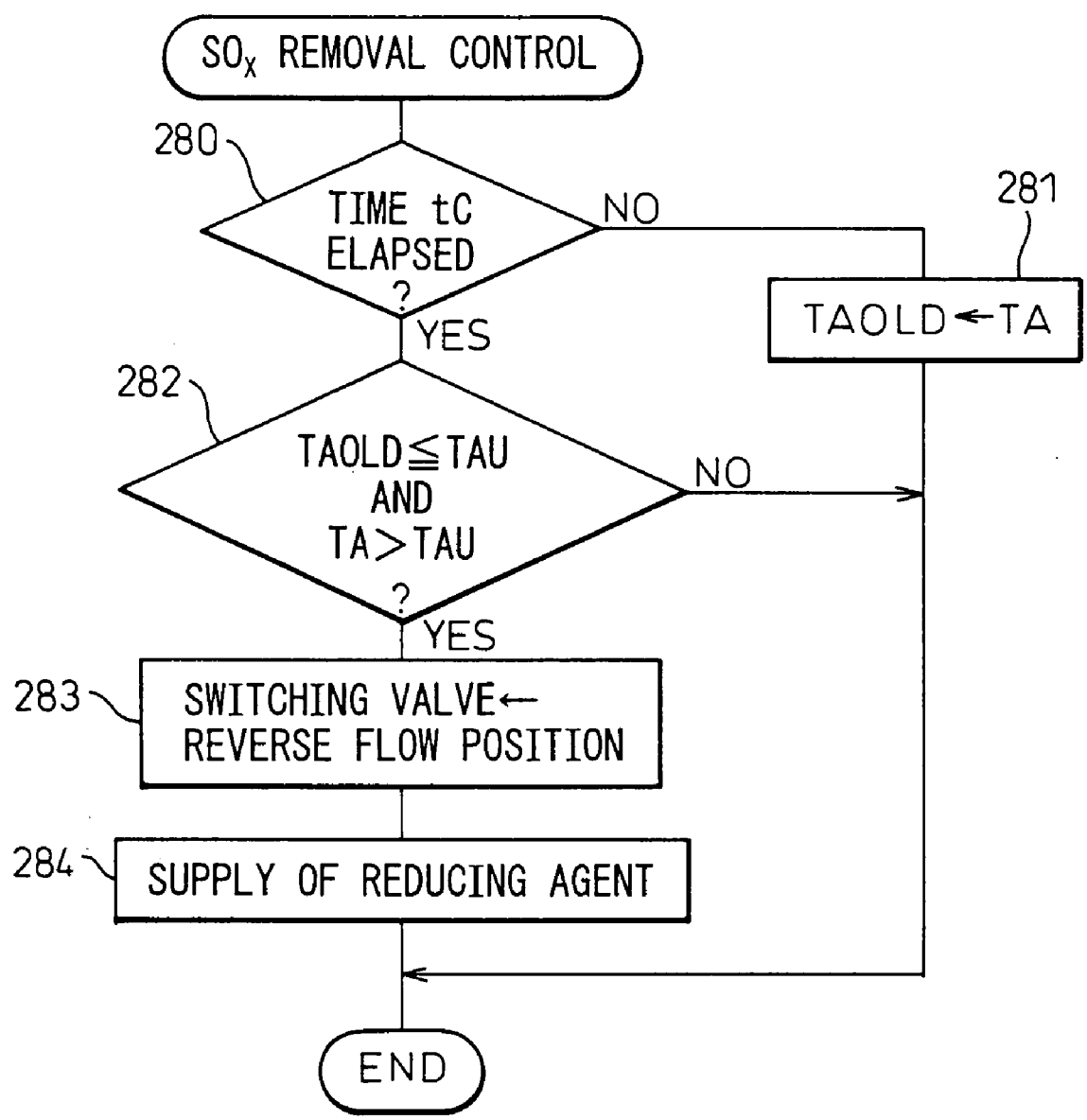
FIG. 19 is a flowchart showing the $SO_x$ removal control routine.

FIG. 19 shows a routine for executing the $SO_x$ removal control described above. This routine is executed by an interruption every predetermined time. Referring to FIG. 19, first, it is judged in step 280 whether the predetermined time tC has elapsed from completion of the $SO_x$ removal control, the particulate oxidation control, or the stored $SO_x$ amount reduction control. When the time tC has not yet elapsed, the process proceeds to the next step 281, where the temperature TA of the auxiliary catalyst 76 at this time is set to TAOLD, and then the processing cycle is ended. When the time tC has elapsed, the process proceeds to step 282 where it is judged whether the temperature TAOLD of the auxiliary catalyst 76 in the preceding processing cycle is not higher than the second allowable upper limit temperature TAU and the temperature TA of the auxiliary catalyst 76 in the present processing cycle is higher than the second allowable upper limit temperature TAU, i.e. whether TA exceeds TAU between the preceding processing cycle and the present processing cycle. When TA has not exceeded TAU between the preceding processing cycle and the present processing cycle, the processing cycle is ended. When TA has exceeded TAU between the preceding processing cycle and the present processing cycle, the process proceeds to step 283 where the switching valve 61 is turned to the reverse flow position. In the next step 284, the reducing agent is supplied from the reducing agent injector 77.

Figure 20:
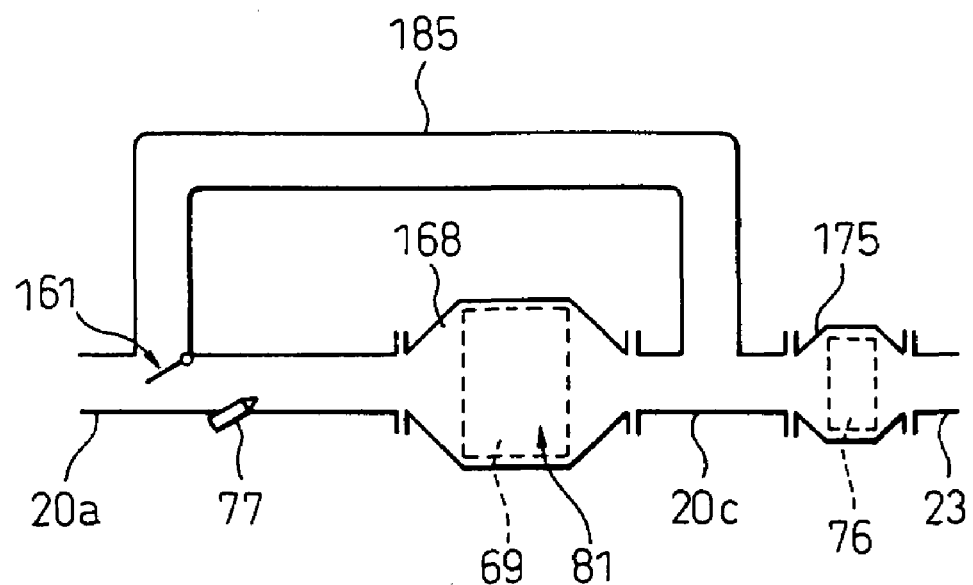
FIG. 20 shows another embodiment.
Figure 22:
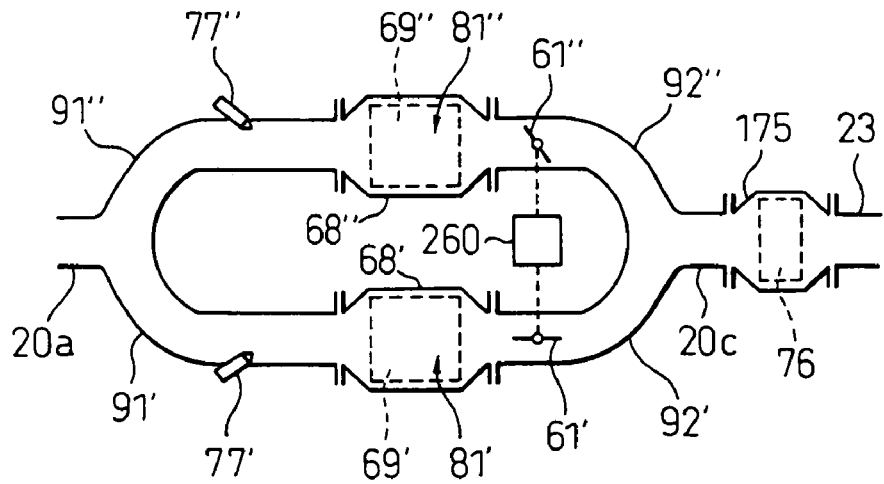
FIG. 22 shows another embodiment.

The embodiments of the present invention described above are applicable also to internal combustion engines, for example, shown in FIGS. 20 and 22.

In the internal combustion engine shown in FIG. 20, the outlet of an exhaust pipe 20a is connected to a casing 168, which in turn is connected to a casing 175 through an exhaust pipe 20c. The casing 175 is connected to an exhaust pipe 23. These casings 168, 175 accommodate therein the particulate filter 69 carrying the $NO_x$ catalyst 81 thereon and the auxiliary catalyst 76, respectively.

A bypass pipe 185 branches from the exhaust pipe 20a. An outlet end of the bypass pipe 185 is open to the exhaust pipe 20c. Also, a switching valve 161 controlled by an electronic control unit, not shown, is arranged on a portion of the exhaust pipe 20a to which an inlet end of the bypass pipe 185 is open. Further, the reducing agent injector 77 is arranged on the exhaust pipe 20a between the inlet end of the bypass pipe 185 and the particulate filter 69.

Figure 21:
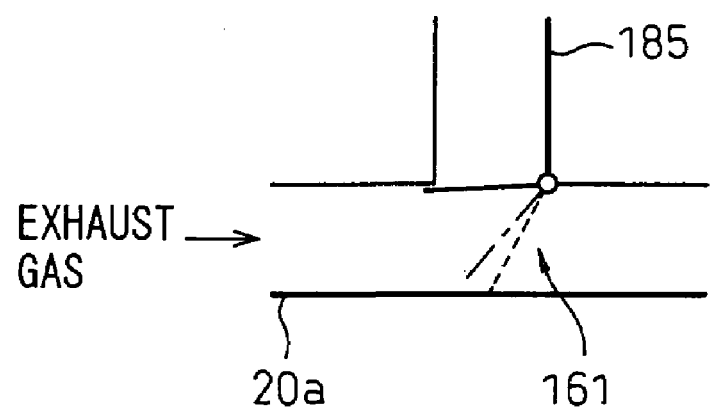
FIG. 21 is a view for explaining a position of the switching valve according to the embodiment shown in FIG. 20.

The switching valve 161 is normally held in a normal position indicated by solid line in FIG. 21. When the switching valve 161 is held in the normal position, the bypass pipe 185 is shut off and, thus, substantially all the exhaust gas flowing through the exhaust pipe 20a is introduced into the particulate filter 69. The normal position of the switching valve 161, therefore, corresponds to the forward or reverse flow position of the switching valve 61 in the internal combustion engine shown in FIG. 1.

An explanation will be given regarding, for example, the first embodiment of the present invention. The switching valve 161 is held at the normal position and the reducing agent is supplied from the reducing agent injector 77 to perform the particulate oxidation control. Upon completion of the particulate oxidation control, the switching valve 161 is turned to and held at a bypass position indicated by dashed line in FIG. 21, while stopping supply of the reducing agent. When the switching valve 161 is held at the bypass position, the bypass pipe 185 is opened and substantially all the exhaust gas flowing through the exhaust pipe 20a circumvents the particulate filter 69. Thus, the bypass position of the switching valve 161 corresponds to the bypass position of the switching valve 61 in the internal combustion engine shown in FIG. 1. When the temperature TA of the auxiliary catalyst 76 becomes not higher than the allowable upper limit temperature TAL, the reducing agent is supplied while the switching valve 161 is turned to and held at a weakened flow position indicated by the one-dot chain in FIG. 21. When the switching valve 161 is held at the weakened flow position, a very small part of the exhaust gas flowing through the exhaust pipe 20a is introduced into the particulate filter 69, and the remaining exhaust gas is introduced into the bypass pipe 185. Thus, the weakened flow position of the switching valve 161 corresponds to the weakened forward flow position of the switching valve 61 in the internal combustion engine shown in FIG. 1.

On the other hand, in the internal combustion engine shown in FIG. 22, the exhaust pipe 20a is comprised of a Y-shaped pipe having a pair of branch pipes 91', 91". Outlets of the branch pipe are connected with respective casings 68', 68". The casings 68', 68" are connected to respective branch pipes 92', 92" of the exhaust pipe 20c, and are connected to the casing 175 through the exhaust pipe 20c. The casing 175 is connected to the exhaust pipe 23. The casings 68', 68" accommodate therein first and second particulate filters 69', 69", respectively, and the casing 175 accommodates the auxiliary catalyst 76. Note that first and second $NO_x$ catalysts 81', 81" are carried on the first and second particulate filters 69', 69", respectively.

First and second switching valves 61', 61", driven by a common actuator 160 are arranged in the respective branch pipes of the exhaust pipe 20c. Also, first and second reducing agent supply pipes 77', 77" are arranged in the respective branch pipes of the exhaust pipe 20a. Note that the actuator 160 and the reducing agent injectors 77', 77" are controlled by an electronic control unit not shown.

Figure 23A:
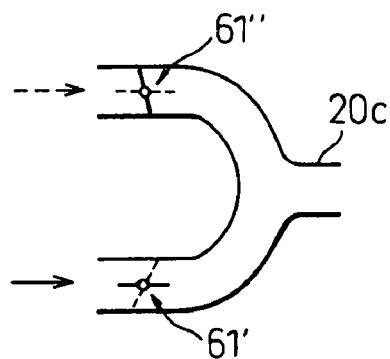
FIGS. 23A and 23B are views for explaining a position of the switching valve according to the embodiment shown in FIG. 22.

The switching valves 61', 61" are normally held in a first normal position indicated by solid line in FIG. 23A, or a second normal position indicated by dashed line. When the switching valves 61', 61", are held in the first normal position, the first switching valve 61' is held at a fully-open position and the second switching valve 61" is held at a fully-closed position. Therefore, substantially all the exhaust gas flowing-through the exhaust pipe 20a is introduced into the first particulate filter 69', as indicated by a solid arrow in FIG. 23A. When the switching valves 61', 61", are held at the second normal position, on the other hand, the first switching valve 61' is held at the fully-closed position and the second switching valve 61" is held at the fully-open position. Thus, as indicated by the dashed arrow in FIG. 23A, substantially all the exhaust gas flowing through the exhaust pipe 20a is introduced into the second particulate filter 69". In this way, the first and second normal positions of the switching valves 61', 61", correspond to the normal position or the bypass position of the switching valve 161 of the internal combustion engine shown in FIG. 20.

Figure 23B:
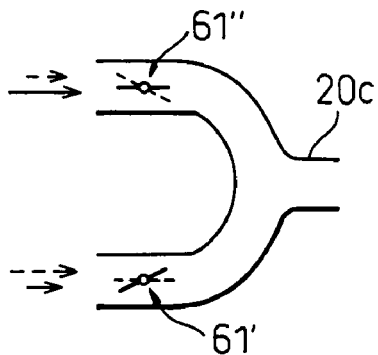

An explanation will be given regarding, for example, the first embodiment of the present invention. The particulate oxidation control of the first particulate filter 69' is performed by supplying the reducing agent from the first reducing agent injector 77' while holding the switching valves 61', 61", at the first normal position. Upon completion of the particulate oxidation control, supply of the reducing agent is stopped, and the switching valves 61', 61" is turned to and held at the second normal position. As a result, the exhaust gas relatively low in temperature flows into the auxiliary catalyst 76, which lowers the temperature TA of the auxiliary catalyst 76. Then, when the temperature TA of the auxiliary catalyst 76 becomes not higher than the allowable upper limit temperature TAL, the reducing agent is supplied while the switching valves 61', 61" are turned to and held at a first weakened flow position indicated by solid line in FIG. 23B. When the switching valves 61', 61", are held at the first weakened flow position, a small part of the exhaust gas flowing through the exhaust pipe 20a is introduced into the first particulate filter 69', while the remaining exhaust gas is introduced into the second particulate filter 69".

Alternatively, the particulate oxidation control of the second particulate filter 69" may be performed by supplying the reducing agent from the second reducing agent injector 77" while holding the switching valves 61', 61" at the second normal position. Upon completion of the particulate oxidation control, supply of the reducing agent is stopped and the switching valves 61', 61" are turned to and held at the first normal position. Then, when the temperature TA of the auxiliary catalyst 76 becomes not higher than the allowable upper limit temperature TAL, the reducing agent is supplied while the switching valves 61', 61" are turned to and held at a second weakened flow position indicated by dashed line in FIG. 23B. When the switching valves 61', 61", are held at the second weakened flow position, a small part of the exhaust gas flowing through the exhaust pipe 20a is introduced into the second particulate filter 69", while the remaining exhaust gas is introduced into the first particulate filter 69'. In this way, the first and second weakened flow positions of the switching valves 61', 61", correspond to the weakened forward flow position of the switching valve 61 in the internal combustion engine shown in FIG. 1.

Generally speaking, therefore, a $NO_x$ catalyst is arranged in an exhaust passage, an auxiliary catalyst is arranged in the exhaust passage downstream of the $NO_x$ catalyst, a bypass passage is formed branching from the exhaust passage upstream of the $NO_x$ catalyst and reaching the exhaust passage between the $NO_x$ catalyst and the auxiliary catalyst, a switching valve is provided for controlling an amount of the exhaust gas flowing through the bypass passage to control an amount of the exhaust gas flowing through the $NO_x$ catalyst, and a reducing agent injector for supplying the reducing agent is arranged in the exhaust passage between the branch portion of the bypass passage and the $NO_x$ catalyst.

In light of the above, in the internal combustion engine shown in FIG. 1, a flow direction of the exhaust gas through the $NO_x$ catalyst is switched between a direction in which the exhaust gas enters into the $NO_x$ catalyst via one end surface thereof and exits from the $NO_x$ catalyst via the other end surface thereof, and an opposite direction in which the exhaust gas enters into the $NO_x$ catalyst via the other end surface thereof and exits from the $NO_x$ catalyst via one end surface thereof.

Also, in the internal combustion engine shown in FIG. 22, taking, for example, the exhaust passage portion from the branch pipe 91' of the exhaust pipe 20a to the branch pipe 92' of the exhaust pipe 20c, into consideration, the exhaust passage portion from the branch pipe 91", of the exhaust pipe 20a to the branch pipe 921 of the exhaust pipe 20c can be regarded as the bypass passage. In this case, the second reducing agent injector 77", the second particulate filter 69" and the second $NO_x$ catalyst 81" constitute an additional reducing agent injector, an additional particulate filter and an additional $NO_x$ catalyst, respectively, which are arranged in the bypass passage.

According to the present invention, it is possible to provide a device for purifying exhaust gas for an engine, capable of reducing an amount of sulfate discharged to the outside air.

While the invention has been described by reference to specific embodiments chosen for purposes of illustration, it should be apparent that numerous modifications could be made thereto by those skilled in the art without departing from the basic concept and scope of the invention.

The invention claimed is:

1. A device for purifying exhaust gas for an engine having an exhaust passage, the engine being operated with a lean air-fuel ratio, the device comprising:

a $SO_x$ storage arranged in the exhaust passage for temporarily storing $SO_x$ contained in an exhaust gas inflowing therein;

an auxiliary catalyst arranged in the exhaust passage downstream of the $SO_x$ storage, the auxiliary catalyst having an oxidizing ability;

$SO_x$ discharging means for discharging $SO_x$ stored in the $SO_x$ storage therefrom; and atmosphere control means for controlling an atmosphere of the auxiliary catalyst, wherein the auxiliary catalyst converts the $SO_x$ discharged from the $SO_x$ storage to sulfate and increases an amount of sulfate being discharged into the outside air when an atmosphere of the auxiliary catalyst is in a sulfate forming atmosphere in which an amount of a reducing agent contained in the exhaust gas flowing to the auxiliary catalyst is smaller than an allowable minimum amount and a temperature of the auxiliary catalyst is higher than an allowable maximum temperature, and when the atmosphere of the auxiliary catalyst is changed to an atmosphere other than the sulfate forming atmosphere, the non-sulfate forming atmosphere of the auxiliary catalyst reduces the amount of sulfate being discharged into the outside air.

2. A device according to claim 1, further comprising means for controlling the temperature of the auxiliary catalyst, wherein the temperature of the auxiliary catalyst is lowered to, or maintained at, a temperature which is not higher than the allowable maximum temperature, to change the atmosphere of the auxiliary catalyst to, or maintain the atmosphere of the auxiliary catalyst at, an atmosphere other than the sulfate forming atmosphere.

3. A device according to claim 1, further comprising means for controlling an amount of the reducing agent contained in the exhaust gas flowing to the auxiliary catalyst, wherein the amount of the reducing agent is increased to, or maintained at an amount which is not smaller than the allowable minimum amount, to change the atmosphere of the auxiliary catalyst to, or maintain the atmosphere of the auxiliary catalyst at, an atmosphere other than the sulfate forming atmosphere.

4. A device according to claim 1, wherein the temperature of the $SO_x$ storage is maintained at a temperature not lower than a $SO_x$ amount reduction required temperature which is higher than the allowable maximum temperature while an air-fuel ratio of the exhaust gas flowing to the $SO_x$ storage is maintained at a rich or stoichiometric air-fuel ratio, to discharge $SO_x$ stored in the $SO_x$ storage therefrom.

5. A device according to claim 1, wherein the $SO_x$ discharging means comprises means for obtaining an amount of $SO_x$ stored in the $SO_x$ storage, and $SO_x$ stored in the $SO_x$ storage is discharged therefrom when the amount of $SO_x$ stored in the $SO_x$ storage is lager than an allowable $SO_x$ amount.

6. A device according to claim 1, wherein the $SO_x$ storage comprises a storage which stores $SO_x$ contained in the inflowing exhaust gas in a fonn of sulfate salt.

7. A device according to claim 1, wherein the $SO_x$ storage comprises a storage which stores $SO_x$ contained in the inflowing exhaust gas without forming sulfate salt.

8. A device according to claim 1, wherein the $SO_x$ storage comprises a $NO_x$ catalyst which stores therein $NO_x$ contained in the inflowing exhaust gas when the air-fuel ratio of the inflowing exhaust gas is lean, and reduces $NO_x$ stored therein to reduce an amount of $NO_x$ stored therein when a reducing agent is contained in the inflowing exhaust gas and the air-fuel ratio of the inflowing exhaust gas is lowered.

9. A device according to claim 1, wherein the auxiliary catalyst includes precious metals such as platinum without including alkali metals, alkali earth metals, and rare earth metals.

10. A device according to claim 1, wherein the auxiliary catalyst comprises a $NO_x$ catalyst which stores therein $NO_x$ contained in the inflowing exhaust gas when the air-fuel ratio of the inflowing exhaust gas is lean, and reducing $NO_x$ stored therein to reduce an amount of $NO_x$ stored therein when a reducing agent is contained in the inflowing exhaust gas and the air-fuel ratio of the inflowing exhaust gas is lowered.

11. A device according to claim 1, further comprising a bypass passage branching from the exhaust passage upstream of the $SO_x$ storage at a branching portion and returning to the exhaust passage between the $SO_x$ storage and the auxiliary catalyst, a switching valve for controlling an amount of the exhaust gas flowing through the bypass passage to control an amount of the exhaust gas flowing through the $SO_x$ storage, and means for supplying a reducing agent arranged in the exhaust passage between the branching portion of the branch passage and the $SO_x$ storage.

12. A device according to claim 11, further comprising means for switching a flow direction of the exhaust gas through the $SO_x$ storage between a direction in which the exhaust gas enters into the $SO_x$ storage via one end surface thereof and exits from the $SO_x$ storage via the other end surface thereof, and an opposite direction in which the exhaust gas enters into the $SO_x$ storage via the other end surface thereof and exits from the $SO_x$ storage via one end surface thereof.

13. A device according to claim 1, wherein the $SO_x$ storage is carried on a particulate filter for collecting particulates contained in the inflowing exhaust gas.

14. A device according to claim 13, wherein, when $SO_x$ stored in the $SO_x$ storage is to be discharged therefrom, first, particulates collected in the particulate filter are oxidized while maintaining a temperature of the particulate filter at a temperature not lower than a particulate oxidation required temperature which is higher than the allowable maximum temperature, and then $SO_x$ stored in the $SO_x$ storage is discharged therefrom.

15. A device according to claim 14, wherein the atmosphere of the auxiliary catalyst is changed to an atmosphere other than the sulfate forming atmosphere when oxidation of particulates collected in the particulate filter is completed, and then discharge of $SO_x$ stored in the $SO_x$ storage therefrom is started.

16. A device according to claim 14, wherein the atmosphere of the auxiliary catalyst is changed to or maintained at an atmosphere other than the sulfate forming atmosphere at the end of oxidation of particulates collected in the particulate filter, and discharge of $SO_x$ stored in the $SO_x$ storage therefrom is started just after oxidation of particulates collected in the particulate filter is completed.

17. A device according to claim 14, further comprising means for introducing at least a part of the exhaust gas to the auxiliary catalyst while bypassing the $SO_x$ storage, wherein at least a part of the exhaust gas is introduced to the auxiliary catalyst while bypassing the $SO_x$ storage, to change the atmosphere of the auxiliary catalyst to or maintain the atmosphere of the auxiliary catalyst at, an atmosphere other than the sulfate forming atmosphere.

18. A device for purifying exhaust gas for an engine having an exhaust passage, the engine being operated with a lean air-fuel ratio, the device comprising:
a $SO_x$ storage arranged in the exhaust passage for temporarily storing $SO_x$ contained in an exhaust gas inflowing therein;
an auxiliary catalyst arranged in the exhaust passage downstream of the $SO_x$ storage, the auxiliary catalyst having an oxidizing ability; and
$SO_x$ discharging means for discharging $SO_x$ stored in the $SO_x$ storage therefrom,
wherein discharge of $SO_x$ stored in the $SO_x$ storage therefrom is prevented or suppressed while the auxiliary catalyst is in, or is turned to, a sulfate forming atmosphere in which the $SO_x$ is converted to sulfate and is discharged to the outside air and in which an amount of a reducing agent contained in the exhaust gas flowing to the auxiliary catalyst is smaller than an allowable minimum amount and a temperature of the auxiliary catalyst is higher than an allowable maximum temperature, whereby the formation and discharge of sulfate from the auxiliary catalyst is reduced.

19. A device according to claim 18, wherein the $SO_x$ storage is carried on a particulate filter for collecting particulates contained in the inflowing exhaust gas.

20. A device according to claim 18, wherein the $SO_x$ discharging means comprises means for obtaining an amount of $SO_x$ stored in the $SO_x$ storage, and $SO_x$ stored in the $SO_x$ storage is discharged therefrom when the amount of $SO_x$ stored in the $SO_x$ storage is lager than an allowable $SO_x$ amount.

21. A device according to claim 18, wherein the $SO_x$ storage comprises a storage which stores $SO_x$ contained in the inflowing exhaust gas in a form of sulfate salt.

22. A device according to claim 18, wherein the $SO_x$ storage comprises a storage which stores $SO_x$ contained in the inflowing exhaust gas without forming sulfate salt.

23. A device according to claim 18, wherein the $SO_x$ storage comprises a $NO_x$ catalyst which stores therein $NO_x$ contained in the inflowing exhaust gas when the air-fuel ratio of the inflowing exhaust gas is lean, and reduces $NO_x$ stored therein to reduce an amount of $NO_x$ stored therein when a reducing agent is contained in the inflowing exhaust gas and the air-fuel ratio of the inflowing exhaust gas is lowered.

24. A device according to claim 18, wherein the auxiliary catalyst includes precious metals such as platinum without including alkali metals, alkali earth metals, and rare earth metals.

25. A device according to claim 18, wherein the auxiliary catalyst comprises a $NO_x$ catalyst which stores therein $NO_x$ contained in the inflowing exhaust gas when the air-fuel ratio of the inflowing exhaust gas is lean, and reducing $NO_x$ stored therein to reduce an amount of $NO_x$ stored therein when a reducing agent is contained in the iniflowing exhaust gas and the air-fuel ratio of the inflowing exhaust gas is lowered.

26. A device according to claim 18, further comprising a bypass passage branching from the exhaust passage upstream of the $SO_x$ storage at a branching portion and returning to the exhaust passage between the $SO_x$ storage and the auxiliary catalyst, a switching valve for controlling an amount of the exhaust gas flowing through the bypass passage to control an amount of the exhaust gas flowing through the $SO_x$ storage, and means for supplying a reducing agent arranged in the exhaust passage between the branching portion of the branch passage and the $SO_x$ storage.

27. A device according to claim 26, further comprising means for switching a flow direction of the exhaust gas through the $SO_x$ storage between a direction in which the exhaust gas enters into the $SO_x$ storage via one end surface thereof and exits from the $SO_x$ storage via the other end surface thereof, and an opposite direction in which the exhaust gas enters into the $SO_x$ storage via the other end surface thereof and exits from the $SO_x$ storage via one end surface thereof.

28. A device according to claim 18, wherein the temperature of the $SO_x$ storage is maintained at a temperature not lower than a $SO_x$ amount reduction required temperature which is higher than the allowable maximum temperature while an air-fuel ratio of the exhaust gas flowing to the $SO_x$ storage is maintained at a rich or stoichiometric air-fuel ratio, to discharge $SO_x$ stored in the $SO_x$ storage therefrom.

29. A device according to claim 28, further comprising means for introducing at least a part of the exhaust gas to the auxiliary catalyst while bypassing the $SO_x$ storage, wherein at least a part of the exhaust gas is introduced to the auxiliary catalyst while bypassing the $SO_x$ storage, to change the atmosphere of the auxiliary catalyst to an atmosphere other than the sulfate forming atmosphere.

30. A device according to claim 18, further comprising atmosphere control means for controlling an atmosphere of the auxiliary catalyst, wherein, when the atmosphere of the auxiliary catalyst is in, or is turned to, the sulfate forming atmosphere, the atmosphere of the auxiliary catalyst is changed to an atmosphere other than the sulfate forming atmosphere and then $SO_x$ stored in the $SO_x$ storage is discharged therefrom, and when the atmosphere of the auxiliary catalyst is in, or is turned to, an atmosphere other than the sulfate forming atmosphere, $SO_x$ stored in the $SO_x$ storage is discharged therefrom while the atmosphere of the auxiliary catalyst is maintained at an atmosphere other than the sulfate forming atmosphere.

31. A device according to claim 30, further comprising means for controlling the temperature of the auxiliary catalyst, wherein the temperature of the auxiliary catalyst is lowered to, or maintained at, a temperature which is not higher than the allowable maximum temperature, to change the atmosphere of the auxiliary catalyst to, or maintain the atmosphere of the auxiliary catalyst at, an atmosphere other than the sulfate forming atmosphere.

32. A device according to claim 30, further comprising means for controlling an amount of the reducing agent contained in the exhaust gas flowing to the auxiliary catalyst, wherein the amount of the reducing agent is increased to, or maintained at, an amount which is not smaller than the allowable minimum amount, to change the atmosphere of the auxiliary catalyst to, or maintain the atmosphere of the auxiliary catalyst at, an atmosphere other than the sulfate forming atmosphere.

* * * * *